United States Patent
Kamihara et al.

(10) Patent No.: US 6,854,020 B1
(45) Date of Patent: Feb. 8, 2005

(54) DATA TRANSFER CONTROLLER AND ELECTRONIC DEVICE

(75) Inventors: Yoshiyuki Kamihara, Sapporo (JP); Takuya Ishida, Sapporo (JP); Fumitoshi Wada, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/582,287

(22) PCT Filed: Oct. 26, 1999

(86) PCT No.: PCT/JP99/05904

§ 371 (c)(1),
(2), (4) Date: Sep. 8, 2000

(87) PCT Pub. No.: WO00/25217

PCT Pub. Date: May 4, 2000

(30) Foreign Application Priority Data

Oct. 27, 1998  (JP) .......................... 10-321489

(51) Int. Cl.[7] .............................. G06F 13/00
(52) U.S. Cl. .................. 710/1; 710/5; 710/33
(58) Field of Search ............... 710/1, 5, 31, 33, 710/52

(56) References Cited

U.S. PATENT DOCUMENTS

| 5,983,301 A | 11/1999 | Baker et al. |
| 6,324,178 B1 * | 11/2001 | Lo et al. ............ 370/392 |

FOREIGN PATENT DOCUMENTS

| EP | 0 574 140 A1 | 12/1993 |
| EP | 0 804 008 A2 | 10/1997 |
| GB | 2 304 505 A | 3/1997 |
| JP | A 7-177164 | 7/1995 |
| JP | A 8-79310 | 3/1996 |
| JP | A-10-23101 | 1/1998 |
| JP | A-10-40211 | 10/1998 |
| JP | A-11-7408 | 1/1999 |
| JP | A-11-17743 | 1/1999 |

OTHER PUBLICATIONS

Nikkei Electronics 1997 9.8 (No. 698), "Direct Connection of Digital Steel Cameras: Connecting Different Type of Machines by Standardization", pp. 107–111.
"An outline of the IEEE 1394 High Performance Serial Bus" (*Interface*, Apr. 1996, pp. 1–10).
"Bus Standards for PC Peripheral Equipment" (*Interface*, Jan. 1997, pp. 106–116).
"Real–Time Transfer Modes and Multimedia–Capable Protocols for IEEE 1394–1995 (FireWire)" (*Interface*, Jan. 1997, pp. 136–146).

* cited by examiner

*Primary Examiner*—Fritz M. Fleming
(74) *Attorney, Agent, or Firm*—Oliff & Berridge, PLC

(57) ABSTRACT

The objective is to provide a data transfer control device and electronic equipment that are capable of reducing processing overheads, thus enabling high-speed data transfer within a compact hardware configuration. During IEEE 1394 data transfer, a packet assembly circuit (280) reads a header and data for a packet from header and data areas in a RAM (80) and links them together. The period of time during which a header CRC is created is used to obtain a data pointer. Whether a header or data is being read is determined by tcode, and the header pointer or data pointer incremented accordingly. A header is created while data is being fetched from the data area. Data is fetched to one channel which a packet is being transmitted from another channel within a divided send packet area. A linkage pointer is used to sequentially read a packet from another channel. An ACK code from the transfer destination is written back to the channel that sent the corresponding packet. Packets can be sent in series by rewriting a basic header to sequentially create headers until a number-of-repeats reaches zero.

15 Claims, 33 Drawing Sheets

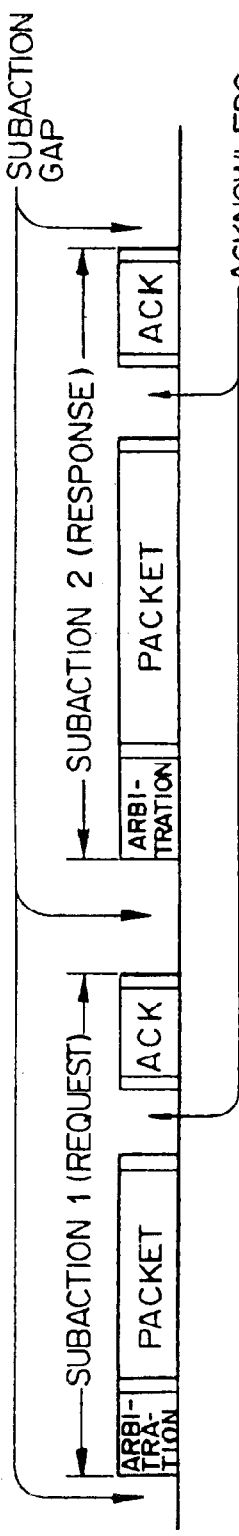
FIG. 1A  ASYNCHRONOUS SUBACTION
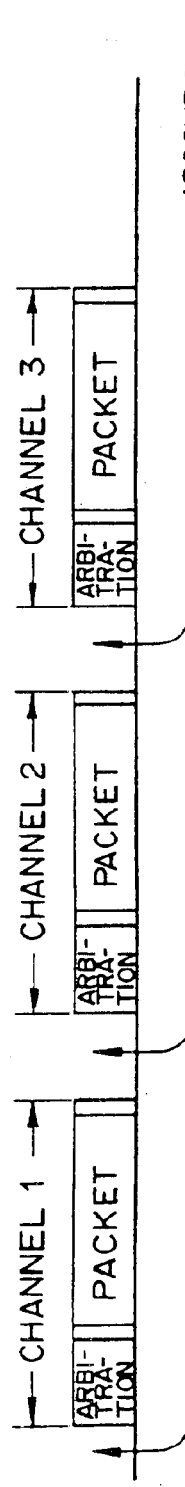
FIG. 1B  ISOCHRONOUS SUBACTION
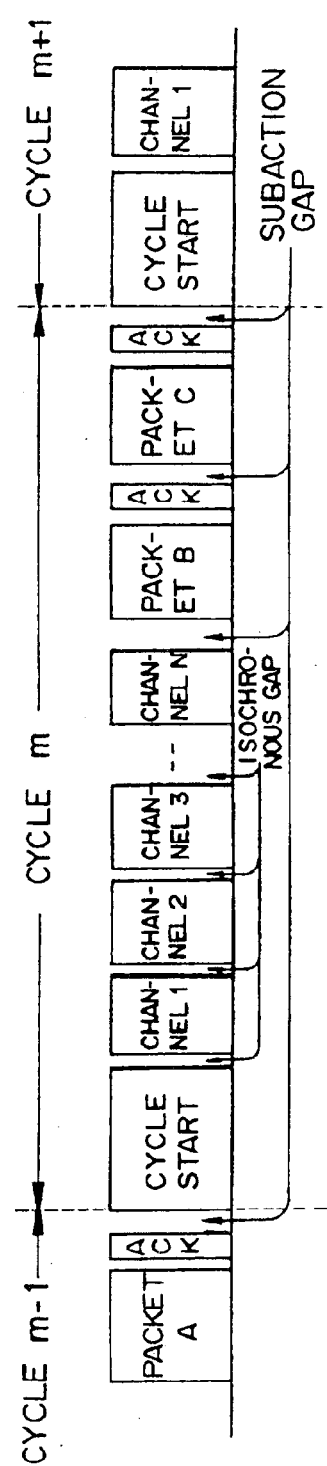
FIG. 1C

FIG. 4A

SELF-ID PACKET #0

| b.31 | | | | | | | | | | | | b.0 |
|---|---|---|---|---|---|---|---|---|---|---|---|---|
| 0 | 10 | PHY_ID | 0 | L | gap_cnt | sp | del | C | pwr | p0 | p1 | p2 | i | m |
| 1 | INVERSION OF FIRST 32 BITS | | | | | | | | | | | |

FIG. 4B

SELF-ID PACKETS #1, #2, #3

| b.31 | | | | | | | | | | | | | b.0 |
|---|---|---|---|---|---|---|---|---|---|---|---|---|---|
| 0 | 10 | PHY_ID | 1 | n | rsv | pa | pb | pc | pd | pe | pf | pg | ph | r | m |
| 1 | INVERSION OF FIRST 32 BITS | | | | | | | | | | | | |

FIG. 4C

LINK-ON PACKET

| b.31 | | | | | | | | b.0 |
|---|---|---|---|---|---|---|---|---|
| 0 | 01 | PHY_ID | 0000 | 0000 | 0000 | 0000 | 0000 | 0000 |
| 1 | INVERSION OF FIRST 32 BITS | | | | | | | |

FIG. 4D

PHY CONFIGURATION PACKET

| b.31 | | | | | | | | | b.0 |
|---|---|---|---|---|---|---|---|---|---|
| 0 | 00 | PHY_ID | R | T | gap_cnt | 0000 | 0000 | 0000 | 0000 |
| 1 | INVERSION OF FIRST 32 BITS | | | | | | | | |

RAM (PACKET STORAGE MEANS)   TRANSMISSION PACKET

RAM (PACKET STORAGE MEANS)

COMPARATIVE EXAMPLE

THIS EMBODIMENT

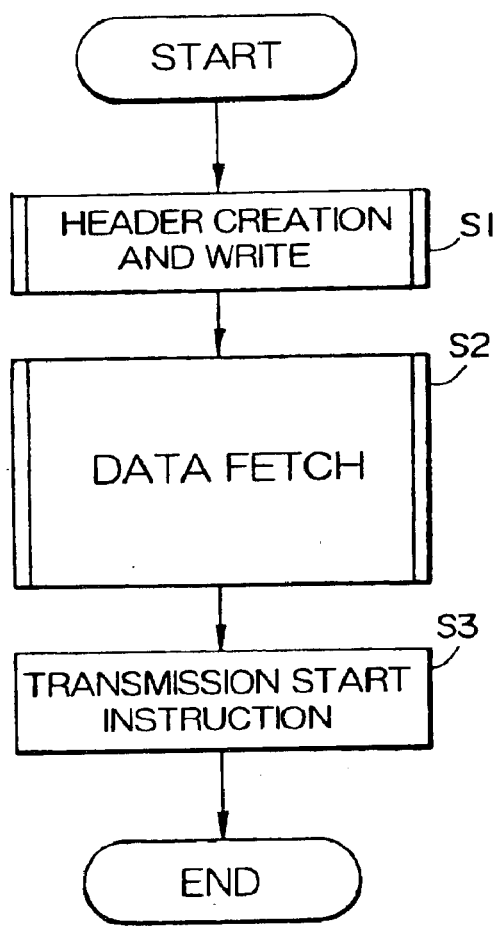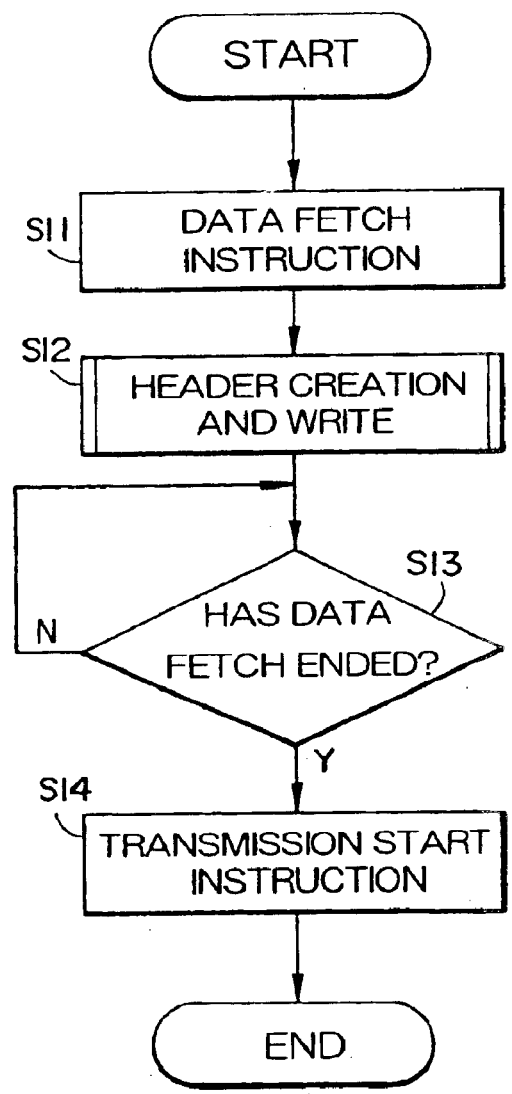
FIG. 16A
FIG. 16B

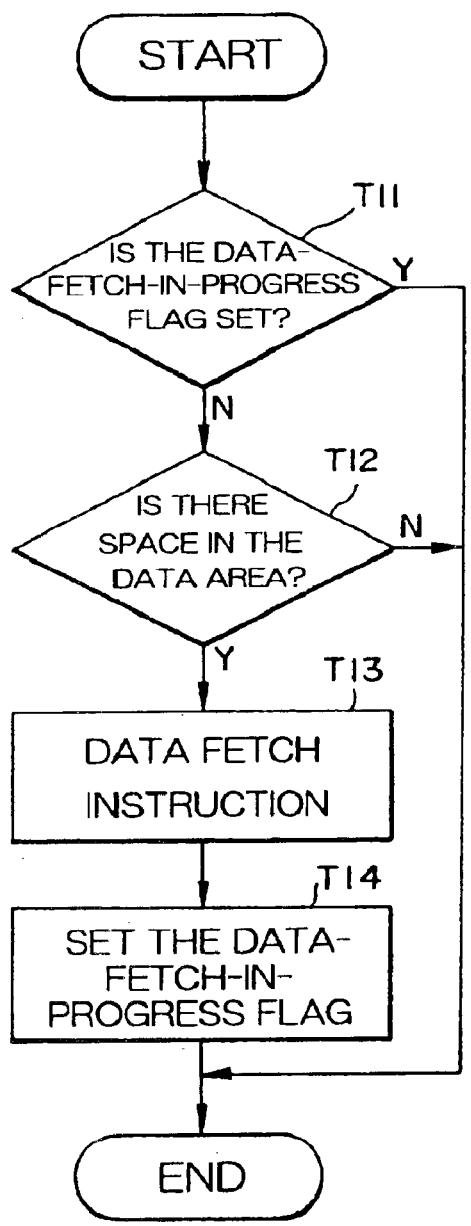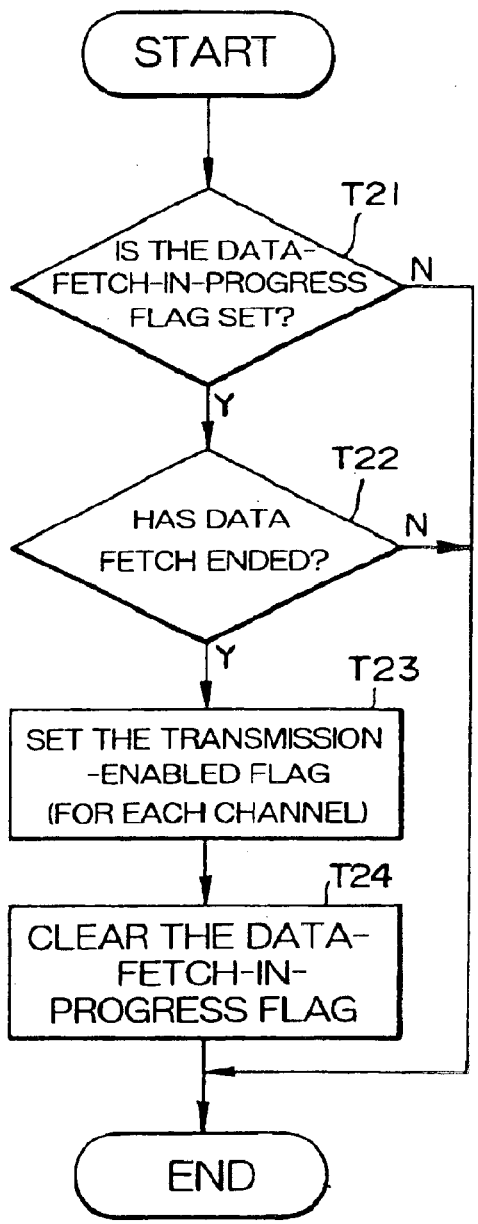

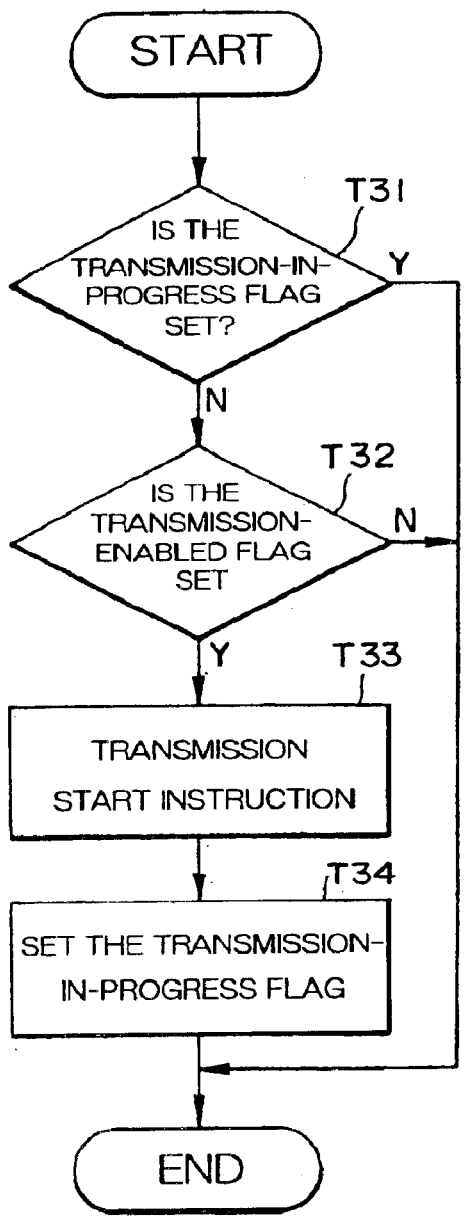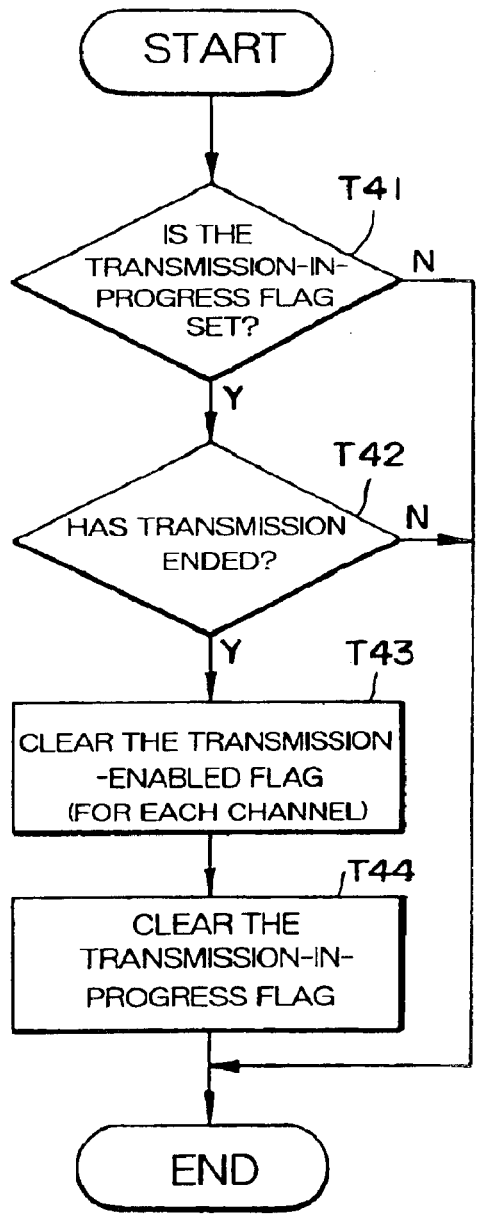

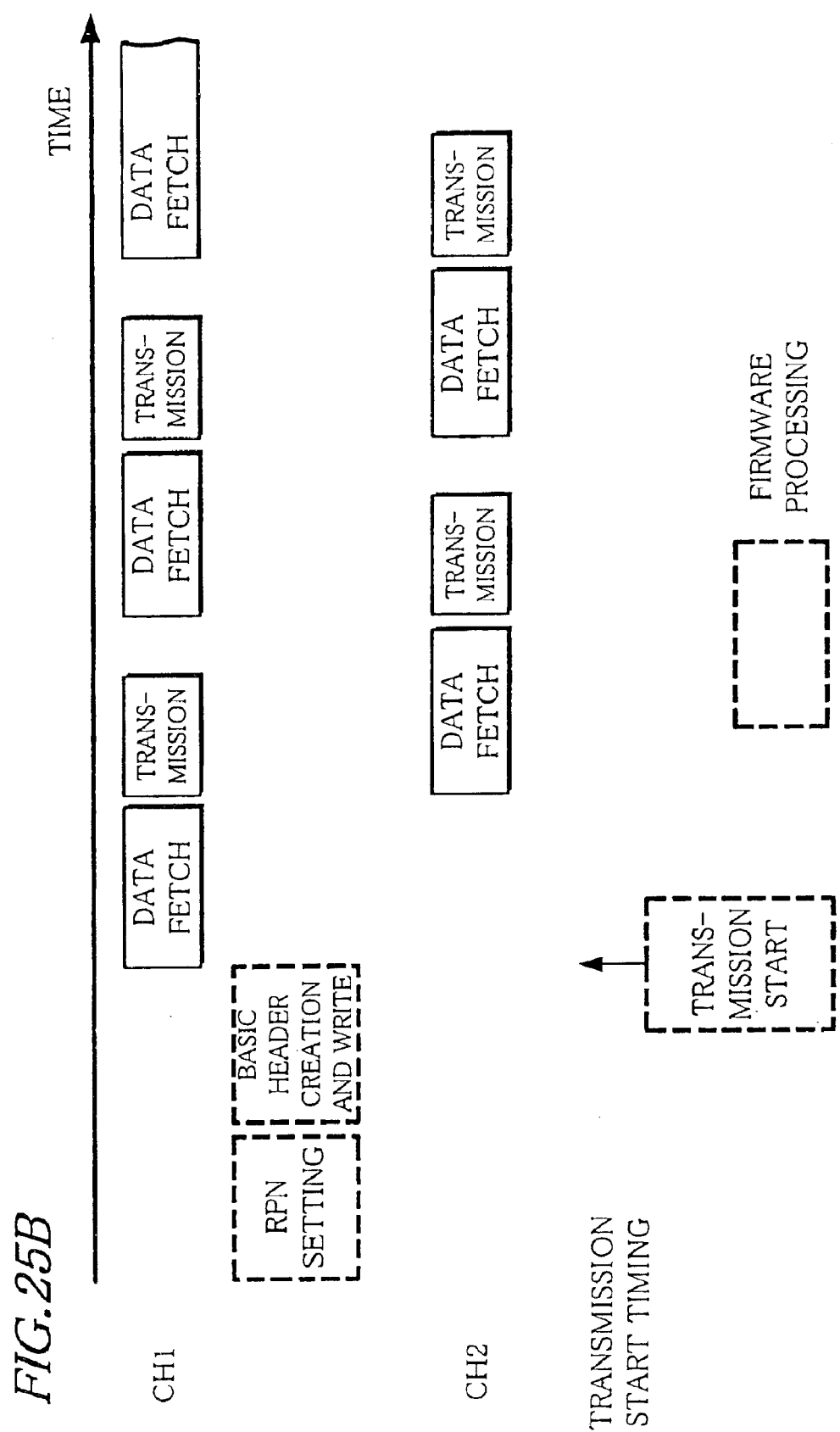

DATA TRANSFER CONTROLLER AND ELECTRONIC DEVICE

TECHNICAL FIELD

The present invention relates to a data transfer control device and electronic equipment comprising the same.

BACKGROUND OF ART

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-R drives, and hard disk drives, but also to domestic appliances such as video cameras, VTRs, and TVs. This standard is therefore expected to enable a dramatic acceleration of the digitalization of electronic equipment.

The concept of IEEE 1394 is disclosed in various publications, such as "An outline of the IEEE 1394 High Performance Serial Bus" (*Interface*, April 1996, pages 1 to 10), "Bus Standards for PC Peripheral Equipment" (*Interface*, January 1997, pages 106 to 116), and "Real-Time Transfer Modes and Multimedia-Capable Protocols for IEEE 1394-1995 (FireWire)" (Interface, January 1997, pages 136 to 146). Texas Instruments' TSB12LV31 is known as a data transfer control device that conforms to IEEE 1394.

However, some technical problems have been identified with such a data transfer control device conforming to IEEE 1394, as described below.

That is to say, the current IEEE 1394 standard does make it possible to implement transfer speeds up to a maximum of 400 Mbps. In practice, however, the presence of processing overheads forces the actual transfer speeds of the entire system to be much slower. In other words, the firmware and application software running on a CPU require large amounts of time for processes such as preparing for transmitting data and reading in received data, which means it is not possible to implement high-speed data transfer overall, no matter how fast the data can be transferred over the IEEE 1394 buses.

A particular problem lies in the fact that a CPU incorporated into peripheral equipment has a lower processing capability than the CPU incorporated into the host system, such as a personal computer. This makes the problem of processing overheads in the firmware and application software extremely serious. It is therefore desirable to provide techniques that are capable of efficiently solving this overhead problem.

DISCLOSURE OF THE INVENTION

The present invention was devised in the light of the above described technical problem, and has as an objective thereof the provision of a data transfer control device and electronic equipment using the same which are capable of reducing the processing overheads of firmware and application software, thus implementing high-speed data transfer within a compact hardware configuration.

In order to solve the above described technical problems, the present invention relates to a data transfer control device for transferring data among a plurality of nodes that are connected to a bus, the data transfer control device comprising: packet assembly means for reading control information of a packet from a control information area of a randomly accessible storage means and reading data of the packet corresponding to the control information from a data area of the randomly accessible storage means, the randomly accessible storage means being divided into the control information area for control information that is written thereto by an upper layer and the data area for data that is written thereto by an upper layer; and link means for providing a service for transferring the read-out packet to each of nodes.

In the present invention, the randomly accessible storage means can be divided into a control information area and a data area. Control information is written into the control information area by an upper layer of the firmware, by way of example, and data is written (fetched) into the data area by an upper layer of application software or the firmware, by way of example. The packet assembly means in accordance with the present invention reads control information from the control information area and also data corresponding to that control information from the data area. A packet configured of control information and data is transferred to another node through link means.

With the present invention, an upper layer may write control information and data to the storage means, regardless of the sequence in which packets will be sent. The upper layer can also write data for packets to be transmitted, in series into the data area. In addition, it is not necessary for the upper layer to participate in processing for linking together the control information from the control information area and data from the data area, to assemble the packet. This aspect of the invention makes it possible to greatly reduce the processing load on the upper layer.

In the present invention, the packet assembly means may obtain a data pointer indicating an address of data that is to be read from the data area, from control information that has been read from the control information area, and uses the obtained data pointer to read data from the data area. This configuration facilitates the reading of data corresponding to the control information from the data area, and also simplifies the processing involved with linking the control information and the data to assemble the packet.

In the present invention, the packet assembly means may utilize a period of time during which the link means is creating error-checking information for the control information of the packet, to obtain a data pointer from control information. This configuration makes it possible to prevent any wastage in processing time, thus speeding up the processing.

In the present invention, the packet assembly means may update a control information pointer indicating an address of control information to be read from the control information area when it is determined based on packet format identification information included in the control information of the packet that the control information of the packet is read, and may update a data pointer indicating an address of data that is to be read from the data area when it is determined based on the packet format identification information that the data of the packet is read. This configuration utilizes the packet format identification information to switch between updating the control information pointer and updating the data pointer, making it possible to link together the control information of a packet and the data of a packet. This simplifies the process of linking together the control information and the data.

The data transfer control device of the present invention may further comprise: control information creation means for creating control information and writing the control information to the control information area, during processing for fetching data to the data area; and transmission start means for instructing a start of transmission of a packet, on condition that both data fetch processing and control information write processing have been completed. This makes it possible to do fetch processing in parallel with the creation and write processing of control information, thus improving the efficiency of the processing.

The present invention also relates to a data transfer control device for transferring data among a plurality of nodes that are connected to a bus, the data transfer control device comprising: transmission start means for instructing transmission start of a packet for which both data fetch processing and control information write processing have been completed, a send packet area of a randomly accessible storage means being divided into a plurality of channels and the packet being one of packets stored in the plurality of channels; read means for reading a packet for which transmission start has been instructed, from a channel corresponding to a send packet area; and link means for providing a service for transferring the read-out packet to each of nodes.

In the present invention, the send packet area of the storage means may be divided into a plurality of areas. When packet preparation (data fetch processing and control information creation and write processing) is completed and the transmission start means instructs transmission start, a packet is read from the corresponding channel and is transmitted. This aspect of the invention therefore makes it possible to prepare a packet in another channel after transmission start has been instructed for a packet in one channel, without waiting for the previous transmission to end. As a result, wastage in processing time can be removed and processing can be made more efficient.

The data transfer control device of the present invention may further comprise means for instructing data fetch for a packet of one channel of the plurality of channels while a packet of another channel is being transmitted. This configuration makes it possible for transmission processing of a packet in one channel to proceed in parallel with data fetch processing for another channel. As a result, the efficiency of processing can be greatly increased when a plurality of packets are to be transmitted in series.

The data transfer control device of the present invention may further comprise: means for instructing data fetch and setting a data-fetch-in-progress flag on condition that the data-fetch-in-progress flag has been cleared, and clearing the data-fetch-in-progress flag on condition that data fetch has ended; and means for instructing transmission start of a packet and setting a transmission-in-progress flag on condition that the transmission-in-progress flag has been cleared, and clearing the transmission-in-progress flag on condition that packet transmission has ended. This use of the data-fetch-in-progress flag and the transmission-in-progress flag makes it possible to avoid a situation in which the data fetch processing for one channel is done while the data fetch processing is still in progress for another channel, or a situation in which transmission processing for one channel is done while transmission processing is still in progress for another channel. This also makes it possible to use a single program to implement the multitasking of transmission processing for packets from a plurality of channels.

In the data transfer control device of the present invention, each packet stored in each of channels may comprise a linkage pointer for linking together related packets; and the read means may use the linkage pointer to sequentially read an packet from another channel, when packet transmission start for one of channels has been instructed by the transmission start means. This configuration ensures that the processing load on the upper layers can be dramatically reduced, by enabling a packet of another channel to be sequentially read by simply instructing the start of transmission of a packet of one channel.

The data transfer control device of the present invention may further comprise write-back means for writing-back acknowledgment information that is sent from a transfer destination of the packet into a channel of the plurality of channels, which is a transmission origin of the packet, within the send packet area. This configuration makes it possible to match each send packet with acknowledgment information that is returned from the transfer destination thereof, in a one-to-one manner. It is therefore possible for the upper layers, such as firmware, to check which acknowledgment information corresponds to which packet, in a simple manner.

The present invention further relates to a data transfer control device for transferring data among a plurality of nodes that are connected to a bus, the data transfer control device comprising: read means for reading out a packet that has been written to storage means; link means for providing a service for transferring the read-out packet to each of nodes; and means for storing at least the same number of acknowledgment information items that are sent from a transfer destination of a packet as a number of packets that can be transferred in series without confirming the sent acknowledgment information. This configuration makes it possible for an upper layer such as in the firmware to instruct the start of transmission of the next packet, without confirming the acknowledgment information that has been sent. As a result, the processing can be made more efficient.

The present invention still further relates to a data transfer control device for transferring data among a plurality of nodes that are connected to a bus, the data transfer control device comprising: means for setting number-of-transmission-repeats information; control information creation means for creating basic control information; transmission start means for instructing a start of packet transmission; control information rewriting means for sequentially creating control information corresponding to data of a packet that is to be transferred in series, by rewriting the basic control information when packet transmission start has been instructed; and means for continuously transferring packets, each of the packets being made up of data and sequentially created control information, until number-of-transmission-repeats information reaches a given value.

The present invention can make it possible to automatically create basic control information and transfer packets in series until the number-of-transmission-repeats information has reached a given value (such as zero), by setting the number-of-transmission-repeats information, setting up the basic control information, and instructing transmission start. This makes it possible to transfer plurality of packets in series, to transfer a large amount of data to another node without increasing the processing load on the firmware.

Note that in the present invention, it is preferable that the basic control information comprises the number-of-transmission-repeats information, a data pointer indicating an address of data that is to be read from a data area in a randomly accessible storage means, and transaction identification information; and wherein the control information rewriting means rewrites the number-of-transmission-repeats information, the data pointer, and the transaction identification information.

In the present invention, the data transfer control device may comprise: a first bus connected to a next-stage application; in a second bus for controlling the data transfer control device; a third bus connected electrically to a physical-layer device; a fourth bus connected electrically to the storage means; and arbitration means for performing arbitration for establishing a data path between any one of the first, second, and third buses and the fourth bus.

In the present invention, mutually separate first, second, and third buses may be provided. The arbitration performed by the arbitration means sets up a data path between one of the first, second, and third buses and the fourth bus of the randomly accessible storage bus. This arrangement makes it possible to store packets that have been received from another node through a physical-layer device, in any desired disposition within the storage means. In addition, the reading and writing of control information of a packet is done using the second bus, so that the first bus can be used for reading and writing the data in the packets. This enables a reduction in the processing load on the upper layers, such as the transaction layer and application layer. It also makes it possible to utilize low-speed buses as the first and second buses and a low-speed, inexpensive device as the device for controlling the data transfer control device. As a result, the data transfer control device can be made more compact and less expensive.

Note that it is sufficient to connect the first, second, third, and fourth buses electrically to the application, a device for controlling the data transfer control device, physical-layer device, and storage means (RAM), respectively, and other devices can exist on these buses.

It is preferable that data transfer according to the present invention is performed in accordance with the IEEE 1394 standard.

Electronic equipment in accordance with the present invention comprises any one of the above described data transfer control devices; a device for performing given processing on data CT that has been received from another node via the data transfer control device and the bus; and a device for outputting or storing data that has been subjected to the processing. Electronic equipment in accordance with a further aspect of the present invention comprises: any one of the above described data transfer control devices; a device for performing given processing on data that is to be sent to another node via the data transfer control device and the bus; and a device for fetching data to be subjected to the processing.

With these aspects of the invention, it is possible to speed up the processing performed within the electronic equipment for outputting or storing data that has been transferred from another node, or the processing performed within the electronic equipment on data that has been fetched thereby and is to be transferred to another node. These aspects of the invention make it possible to make the data transfer control device more compact and also reduce the processing loads on firmware that controls the data transfer, thus making it possible to produce electronic equipment that is less expensive and more compact.

BRIEF DESCRIPTION OF THE DRAWINGS

FIGS. 1A, 1B, and 1C are illustrative of the concepts of asynchronous transfer and isochronous transfer;

FIGS. 4A, 4B, 4C, and 4D show the formats of various physical-layer packets such as a self-ID packet;

FIGS. 16A and 16B are flowcharts illustrating the processing of firmware that implements the method of FIGS. 15A and 15B;

FIGS. 20A and 20B are flowcharts illustrating the processing of firmware when the send packet area has been divided into a plurality of channels;

FIGS. 21A and 21B are also flowcharts illustrating the processing of firmware when the send packet area has been divided into a plurality of channels;

FIGS. 25A and 25B are illustrative of the advantages of this method in which a basic header is rewritten to enable the transfer of a series of packets;

BEST MODE FOR CARRYING OUT THE INVENTION

Figure 2A:
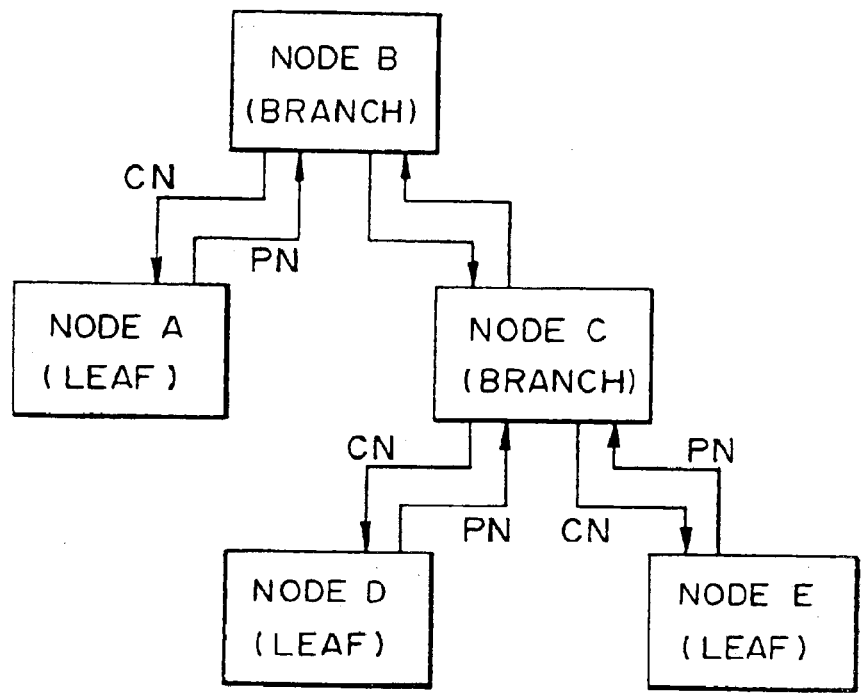
FIGS. 2A and 2B are illustrative of the concept of tree identification.

Preferred embodiments of the present invention are described below with reference to the accompanying drawings.

1. IEEE 1394

The description first relates to an outline of IEEE 1394.

1.1 Data Transfer Speed and Connection Topology

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration, in which a maximum of 63 nodes can be connected to one bus. Note that the use of bus bridges enables the connection of approximately 64,000 nodes.

When power is applied or devices have been disconnected or connected while power is on, a bus reset occurs and all information relating to connection topology is cleared thereby. After the bus reset, tree identification (determination of the root node) and self-identification are performed. Subsequently, the nodes that are to act as management nodes, such as the isochronous resource manager, cycle master, and bus manager, are determined. Ordinary packet transfer then starts.

1.2 Transfer Methods

IEEE 1394 provides for asynchronous transfer (suitable for data transfers where reliability is required) and isochronous transfer (suitable for transfers of data such as moving images and audio, where real-time capabilities are required), as packet transfer methods.

An example of an asynchronous subaction is shown in FIG. 1A. One subaction consists of arbitration, packet transfer, and acknowledgment. In other words, data transfer has precedence but first of all arbitration relating to the right of use of the bus takes place. A packet is then transferred from the source node (the originator of the transfer) to the destination node (the By destination of the transfer). A source ID and a destination ID are comprised within the header of this packet. The destination node reads this destination ID and determines whether or not the packet is addressed to itself. If the destination node accepts the packet, it sends an acknowledgment (ACK) packet back to the source node.

There is an acknowledgment gap between the packet transfer and the ACK packet. There is also a subaction gap between one subaction and the next subaction. Arbitration for the next subaction cannot occur until a fixed bus idle time that is equivalent to this subaction gap has elapsed. This prevents collisions between subactions.

An example of an isochronous subaction is shown in FIG. 1B. Since an isochronous transfer is performed as a broadcast (transfer to all nodes connected to the bus), no ACK is sent when a packet is received. With isochronous transfer, packet transfer is performed by using channel numbers, not node IDs. Note that there is an isochronous gap between subactions.

The state of the bus during data transfer is shown in FIG. 1C. Isochronous transfer starts whenever the cycle master generates a cycle start packet at fixed intervals. This enables the transfer of at least one packet every 125 µs, for one channel. This makes it possible to transfer data that requires real-time capabilities, such as moving images or audio.

Asynchronous transfer occurs in intervals between isochronous transfers. In other words, isochronous transfer has a higher priority than asynchronous transfer. This is implemented by making the length of an isochronous gap shorter than the length of a subaction gap during asynchronous transfer, as shown in FIG. 1C.

1.3 Tree Identification

Tree identification is performed after a bus reset. During this tree identification, the parent-child relationships between nodes and the root node are determined.

First of all, each leaf node (a node that is connected to only one other node) sends a "parent-notify" (PN) to the adjacent node. If nodes A, B, C, D, and E are connected as shown in FIG. 2A, by way of example, parent-notify is sent from node A to node B and from nodes D and E to node C.

A node that has accepted a parent-notify recognizes that the originating node is its own child. It then sends a "child-notify" (CN) to that node. In the example shown in FIG. 2A, a child-notify is sent from node B to node A and from node C to nodes D and E. This determines the parent-child relationships between nodes B and A, nodes C and D, and nodes C and E.

Figure 2B:
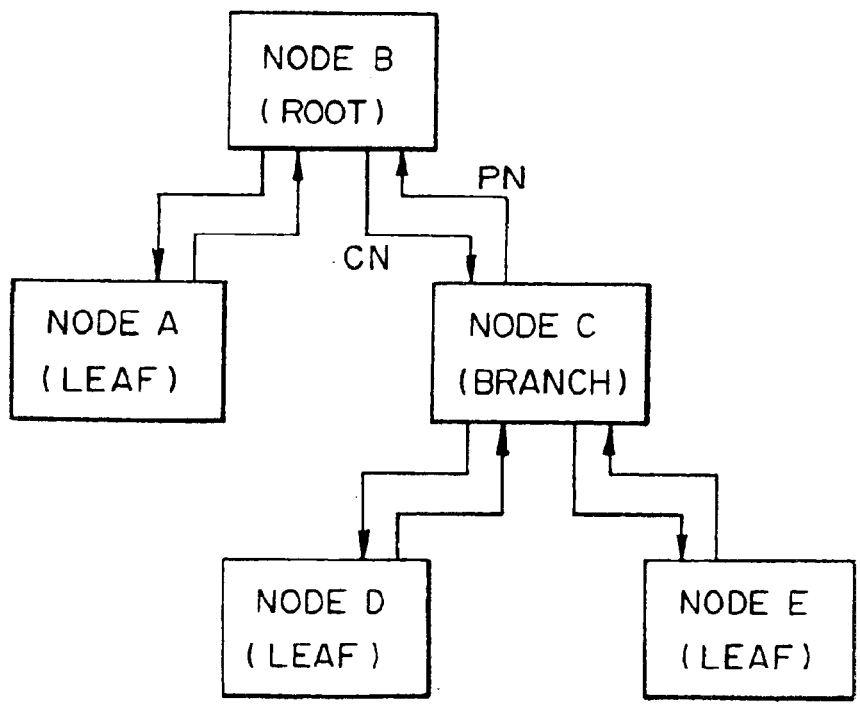

The parent-child relationship between nodes B and C is determined by which of them sends a parent-notify first. If, for example, node C sends the parent-notify first, node B becomes the parent and node C the child, as shown in FIG. 2B.

A node wherein all nodes connected to the ports thereof are own-children becomes the root. In FIG. 2B node B has become the root. Note that IEEE 1394 allows for the possibility of any node becoming the root.

1.4 Self Identification

After tree identification, self-identification is performed. During self-identification, self-ID packets are transferred in sequence starting from the nodes furthermost from the root node within the connection topology.

Figure 3:
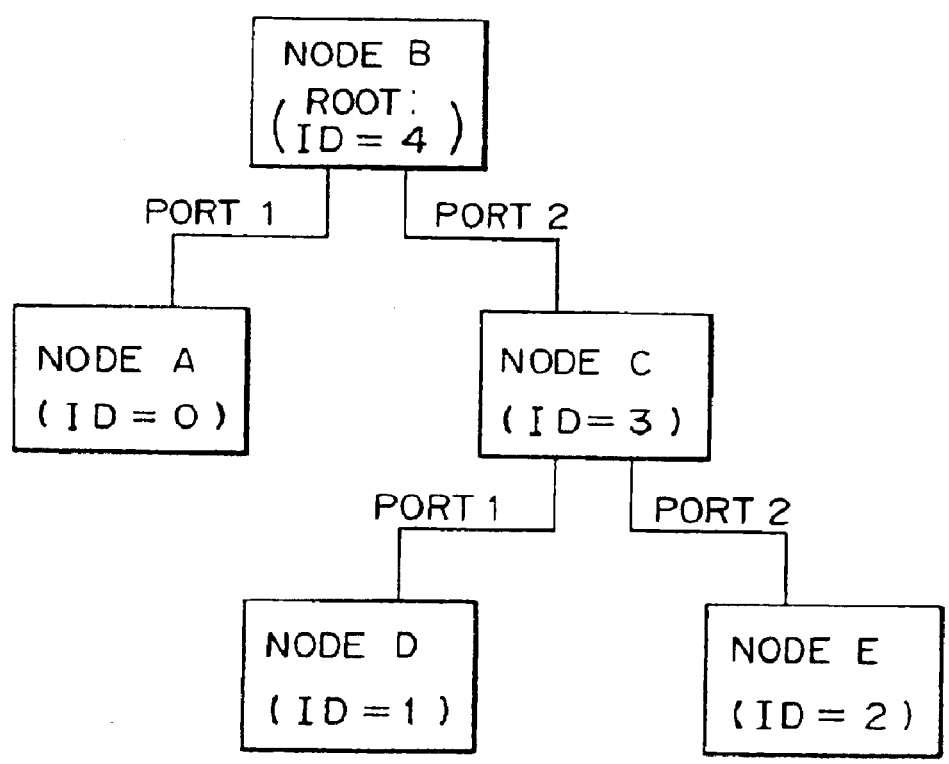
FIG. 3 is illustrative of the concept of self-identification.

More specifically, node A, which is connected to port 1 (the port with the smaller number) of the root node B in the configuration shown by way of example in FIG. 3, first broadcasts a self-ID packet (self identification packet) to all the nodes.

Node C, which is connected to port 2 (the port with the larger number) of the root node B, is then selected and node D, which is connected to port (the port with the smaller number) of node C, broadcasts a self-ID packet. Node E, which is connected to port 2 (the port with the larger number) of node C, then broadcasts a self-ID packet, followed by node C. Finally, node B, which is the root, broadcasts a self-ID packet and self identification is complete.

The ID of each node is comprised within that node's self-ID packet. The ID of that node is the total number of self-ID packets that have been received from other nodes up to the point at which that node broadcasts its own self-ID packet. Taking the example shown in FIG. 3, no node has yet broadcast a self-ID packet at the point at which node A broadcasts, so the ID of node A becomes 0. Node A broadcasts a self-ID packet containing the ID of 0. When node D broadcasts, only node A has issued a self-ID packet. Therefore, the ID of node D becomes 1. In a similar manner, the IDs of nodes E, C, and B become 2, 3, and 4, respectively.

The format of a self-ID packet is shown in FIG. 4A. As shown in this figure, basic information on the nodes is comprised within the self-ID packets. More specifically, information such as the ID of each node (PHY_ID), whether or not the link layer is active (L), the gap-count (gap_cnt), the transfer speed (sp), whether or not the node has the capability of becoming an isochronous resource manager (C), the power state (pwr), and the port states (p0, p1, p2) is comprised therein.

Note that FIG. 4B shows the format of self-ID packets #1, #2, and #3 that are used when a node has 4 or more ports. If a node has between 4 and 11 ports, self-ID packets #0 (FIG. 4A) and #1 are used; if a node has between 12 and 19 ports, self-ID packets #0, #1, and #2 are used; and if a node has between 20 and 27 ports, self-ID packets #0, #1, #2, and #3 are used.

The formats of a link-on packet and a PHY configuration packet, which are physical-layer packets (PHY packets) in a similar manner to the self-ID packets, are shown in FIGS. 4C and 4D.

1.5 Isochronous Resource Manager

The isochronous resource manager (IRM) has the management functions described below first of all, it provides the various resources necessary for isochronous transfer. For example, it provides a channel number register and a bandwidth register. Secondly, it provides a register that indicates the ID of the bus manager. Thirdly, it takes on some of the bus management functions if there is no other bus manager.

Of the nodes which have the capability of becoming the IRM (which are capable of managing isochronous resources) and which are also in an operational state (having an active link layer), i.e., of the nodes qualified to become the IRM, the node closest to the root (the node with the largest ID) becomes the IRM. More specifically, of the nodes having self-ID packets (see FIG. 4A) wherein the C (CONTENDER) bit indicating whether or not that node has IRM capability and the L (LINK-ACTIVE) bit indicating whether or not the link layer is active are both 1, the closest node to the root (the node with the largest PHY-ID) becomes the IRM. If the C bit and L bit of the self-ID packet of the root node are both 1, for example, the root node will become the IRM.

1.6 Cycle Master and Bus Manager

The cycle master has the role of issuing the cycle start packet shown in FIG. 1C, and the root node becomes the cycle master.

The bus manager performs tasks such as creating a topology map (the connection states of all the nodes), creating a speed map, managing power to the bus, determining the cycle master, and optimizing the gap count.

1.7 Protocol Configuration

Figure 5:
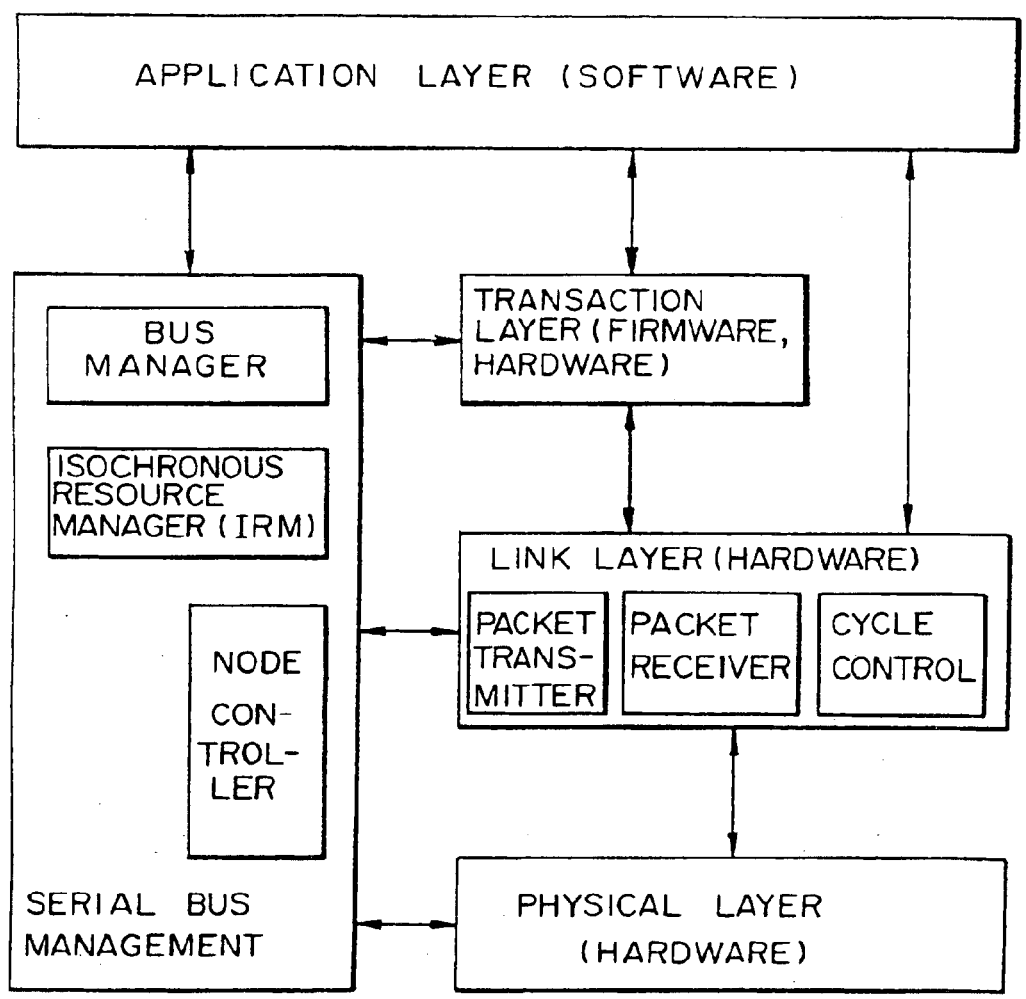
FIG. 5 is illustrative of the IEEE 1394 protocol configuration.

The description now turns to the protocol configuration (layer structure) of IEEE 1394, with reference to FIG. 5.

The IEEE 1394 protocol comprises a physical layer, a link layer, and a transaction layer. The serial bus management function monitors and controls the physical layer, link layer, and transaction layer, and provides various functions for controlling nodes and managing bus resources.

The physical layer converts the logical symbols used by the link layer into electrical signals, performs bus arbitration, and defines the physical bus interface.

The link layer provides functions such as addressing, data check, data framing, and cycle control.

The transaction layer defines the protocol for transactions such as read, write, and lock.

The physical layer and link layer are usually implemented by hardware such as a data transfer control device (interface chip). The transaction layer is implemented either by firmware operating on the CPU, or hardware.

2. Overall Configuration

The overall configuration of this embodiment is described below, with reference to FIG. 6.

Figure 6:
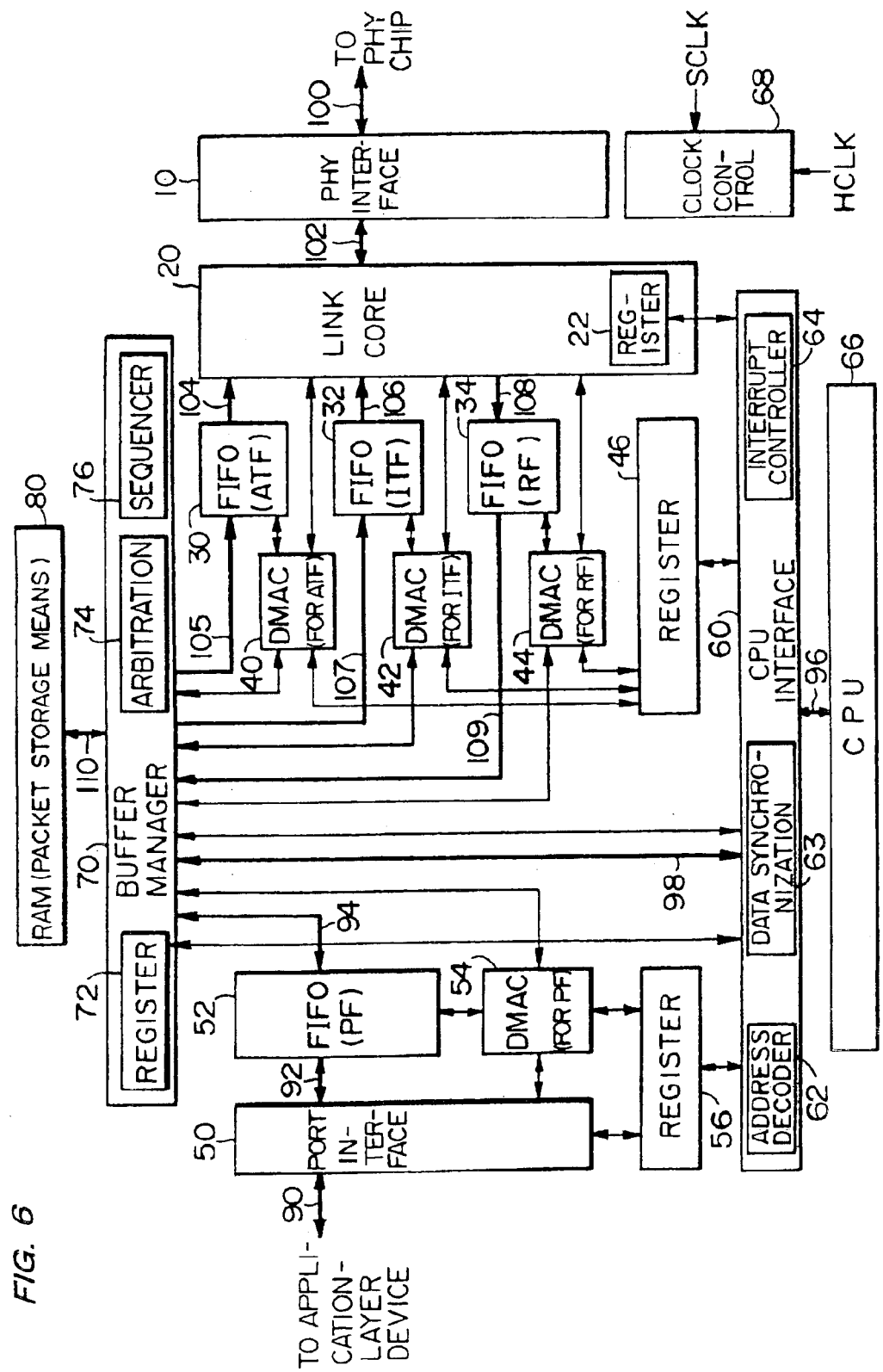
FIG. 6 shows a structural example of the data transfer control device of an embodiment of the present invention.

In FIG. 6, a PHY interface 10 is a circuit that provides an interface with a PHY chip that implements the physical-layer protocol.

A link core 20 (link means) is a circuit that implements part of the link layer protocol and the transaction layer protocol; it provides various service relating to packet transfer between nodes. A register 22 is provided to control the link core 20 that implements these protocols.

C) A FIFO (ATF) 30, FIFO (ITF) 32, and FIFO (RF) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

DMACs 40, 42, and 44 are DMA controllers for ATF, ITF, and RF, respectively. Use of these DMACs 40, 42, and 44 makes it possible to transfer data between a RAM 80 and the link core 20 without going through a CPU 66. Note that a register 46 provides control the DMACs 40, 42, 44, and the like.

A port interface 50 is a circuit that provides an interface with application-layer devices (such as printer drivers, by way of example). In this embodiment of the invention, the use of this port interface 50 makes it possible to transfer 8-bit data, for example.

A FIFO (PF) 52 is a FIFO used for transferring data between an application-layer device and a DMAC 54 is a DMA controller for PF. A register 56 provides control over the port interface 50 and the DMAC 54.

A CPU interface 60 provides an interface with the CPU 66 that controls the data transfer control device. The CPU interface 60 comprises an address decoder 62, a data synchronization circuit 63, and an interrupt controller 64. A clock control circuit 68 controls the clock signals used by this embodiment, and an SCLK signal sent from the PHY chip and an HCLK signal that is a master clock are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

Figure 7:
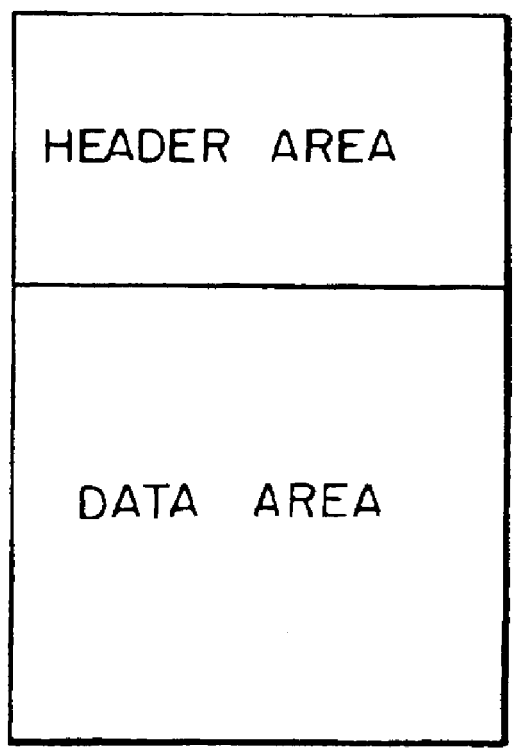
FIG. 7 is illustrative of the separation between the header (control information) area and the data area.

The RAM 80 functions as a randomly accessible packet storage means, where this function is implemented by SRAM or DRAM or the like. In this embodiment of the invention, the RAM 80 is divided into a header area (broadly speaking, a control information area) and a data area, as shown in FIG. 7. The header of a packet (broadly speaking, control information) is stored in the header area of FIG. 7, and the data of the packet is stored in the data area thereof.

Note that the RAM 80 is preferably accommodated within the data transfer control device of this embodiment. However, it is possible to attach part or all of the RAM 80 externally.

A bus 90 (or buses 92- and 94) is for connections to applications, as a first bus. Another bus 96 (or bus 98) is for controlling the data transfer control device, as a second bus, which is connected electrically to a device (such as a CPU) that controls the data transfer control device. Yet another bus 100 (or buses 102, 104, 105, 106, 107, 108, and 109) is for electrical connections to physical-layer devices (such as the PHY chip), as a third bus. A further bus 110 (a fourth bus) is for electrical connections to RAM that acts as a randomly accessible storage means.

The arbitration circuit 74 in the buffer manager 70 arbitrates bus access requests from the DMAC 40, the DMAC 42, the DMAC 44, the CPU interface 60, and the DMAC 54. Based on the results of this arbitration, a data path is established between one of the buses 105, 107, 109, 98, and 94 and the bus 110 of the RAM 80 (i.e., a data path is established between one of the first, second, and third buses and the fourth bus).

One feature of this embodiment is the way in which it is provided with the RAM 80, which stores packets in a randomly accessible manner, and also the mutually independent buses 90, 96, and 100 as well as the arbitration circuit 74 for connecting one of those buses to the bus 110 of the RAM 80.

Figure 8:
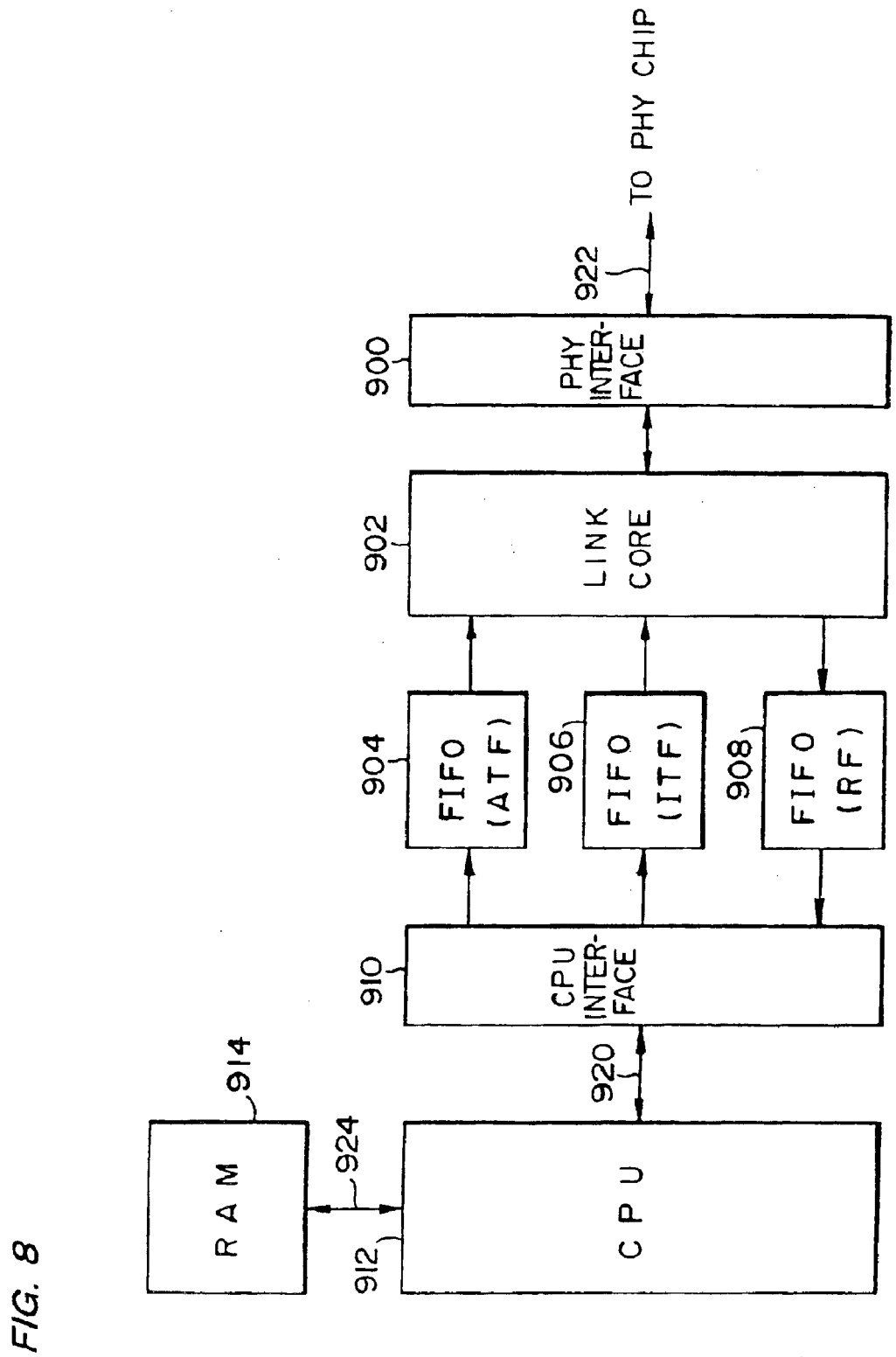
FIG. 8 shows the structure of a comparative example for this embodiment.

A data transfer control device that has a different configuration from that of this embodiment is shown in FIG. 8, by way of example. In this data transfer control device, a link core 902 is connected to a PHY chip by a PHY interface 900 and a bus 922. The link core 902 is connected to a CPU 912 by FIFOs 904, 906, and 908, a CPU interface 910, and a bus 920. The CPU 912 is also connected to a RAM 914, which is local memory in the CPU, by a bus 924.

Note that the FIFOs 904, 906, and 908 differ from the FIFOs 30, 32, and 34 of FIG. 6 in that they each have an extremely large number of stages (such as 16 stages per FIFO).

Figure 9:
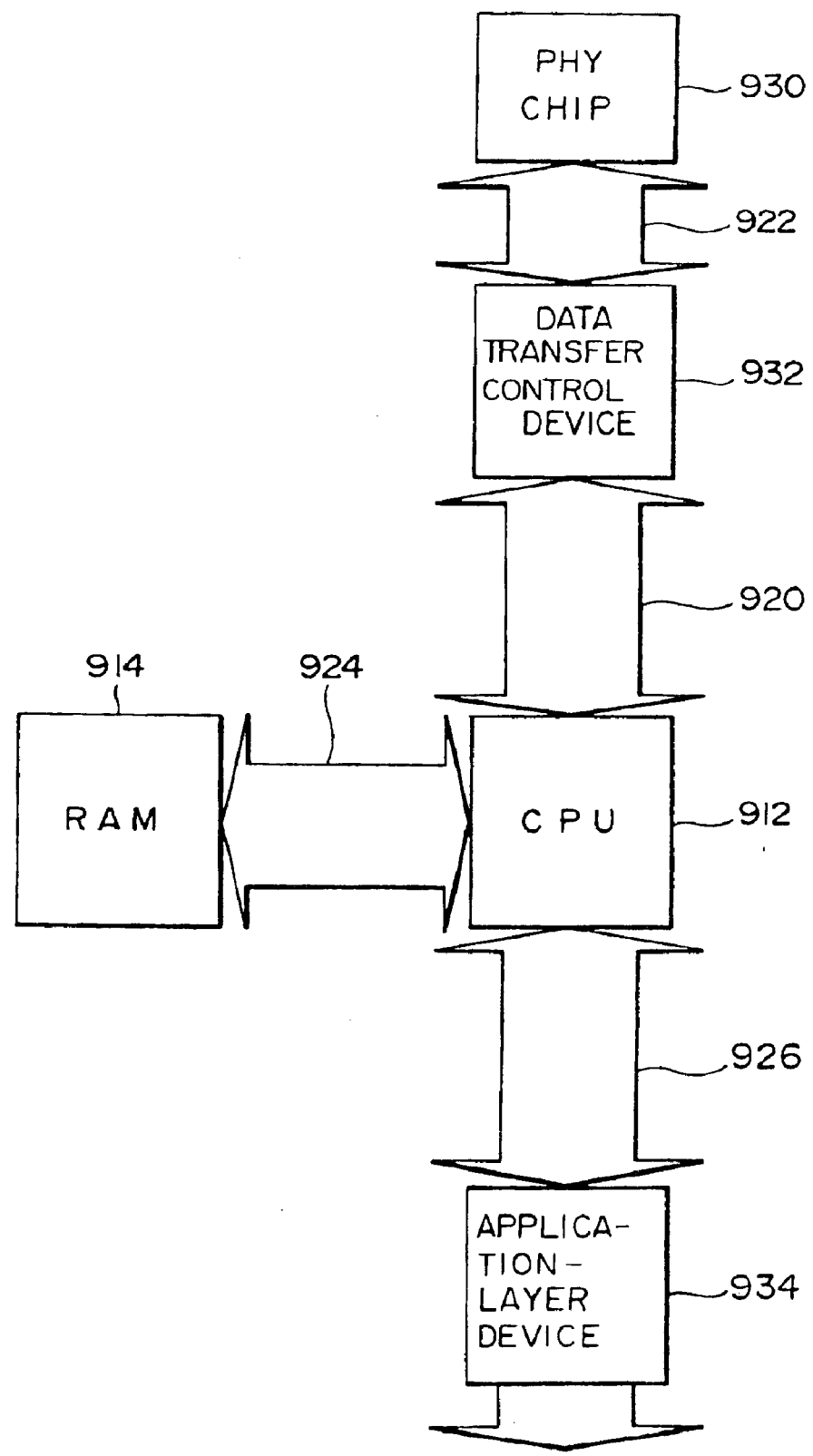
FIG. 9 is illustrative of the method of data transfer used by the configuration of FIG. 8.

The method of data transfer used with the data transfer C1 control device configured as shown in FIG. 8 will now be described with reference to FIG. 9. A receive packet sent from another node through a PHY chip 930 passes through the bus 922, a data transfer control device 932, and the bus 920, then is accepted by the CPU 912. The CPU 912 writes the accepted receive packet to the RAM 914 over the bus 924. The CPU 912 processes the receive packet into a form that can be used by the application layer, then transfers it to an application-layer device 934 over a bus 926.

When the application-layer device 934 transfers data, on the other hand, the CPU 912 writes this data to the RAM 914. A header is attached to the data in the RAM 914 to create a packet that conforms to IEEE 1394. The thus created packet is sent to another node over the path comprising the data transfer control device 932 and the PHY chip 930.

However, if this data transfer method is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

Figure 10:
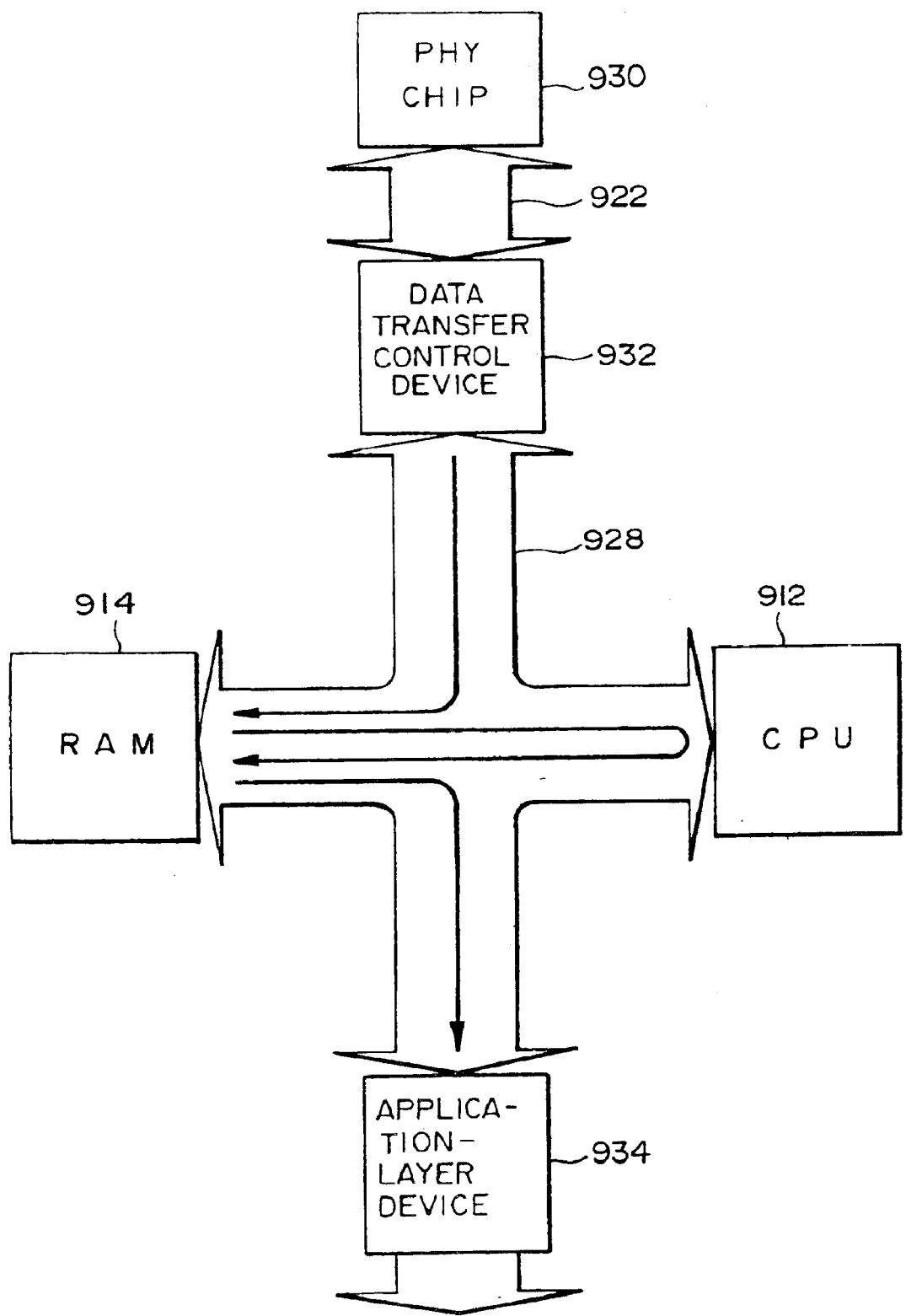
FIG. 10 is illustrative of another method of data transfer.

One method that can be considered for solving this problem uses hardware DMA to implement data transfer between the data transfer control device 932 and the RAM 914 and data transfer nJ between the RAM 914 and the application-layer device 934, as shown in FIG. 10.

With this method, however, a CPU bus 928 must be used for data transfers between the data transfer control device 932 and the RAM 914, between the RAM 914 and the CPU 912, and between the RAM 914 and the application-layer device 934. This means that if an attempt is made to increase the speed of data transfers within the entire system, a high-speed bus such as a PCI bus must be used as the CPU bus 928, leading to an increase in the cost of electronic equipment that uses this data transfer control device.

Figure 11:
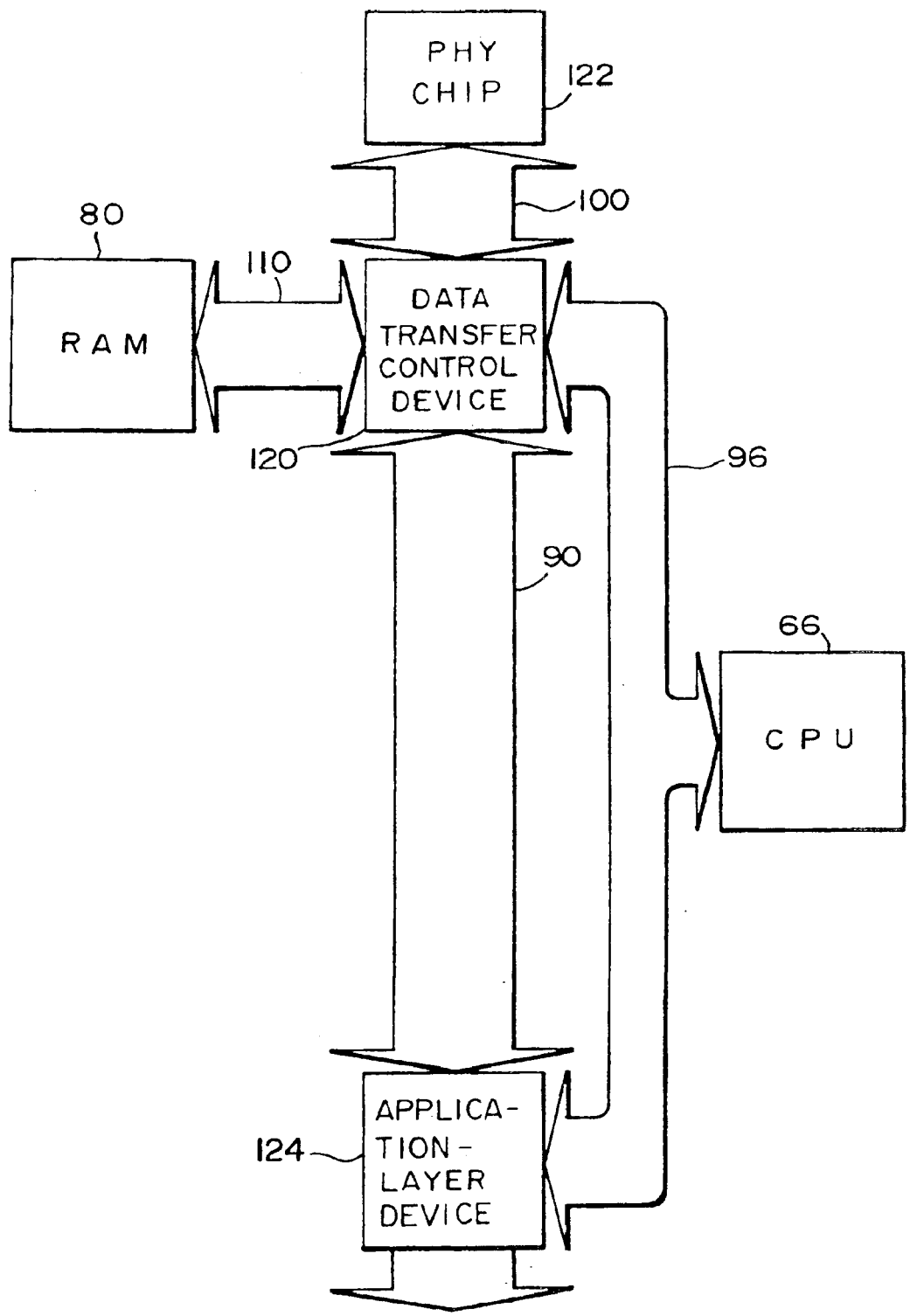
FIG. 11 is illustrative of the method of data transfer used by this embodiment of the invention.

In contrast thereto, this embodiment of the invention ensures that the bus 90 between a data transfer control device 120 and an application-layer device 124; the CPU bus 96; and the bus 110 between the data transfer control device 120 and the RAM 80 are mutually separated, as shown in FIG. 11. The configuration is therefore such that the CPU bus 96 can be used solely for controlling data transfer. In addition, the bus 90 is dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Send Packet Format 3.1 Features of This Embodiment

In this embodiment of the invention, the storage area in the RAM 80 is divided into a header area (broadly speaking, a control information area) in which is stored a packet header (broadly speaking, control information) and a data area in which is stored data of a packet, as shown in FIG. 7.

In the comparative example shown by way of example in FIG. 8, the CPU 912 has to input the send packets to the FIFOs 904 and 906 in the sequence in which they will be sent. If, for example, packet 1 (header 1, data 1), packet 2 (header 2, data 2), and packet 3 (header 3, data 3) are to be sent, the send packets must be input to the FIFOs 904 and 906 in the sequence: header 1, data 1, header 2, data 2, header 3, then data 3. This means that the CPU 912 has do to some rearrangement processing, and thus the processing load on the CPU 912 is extremely large. This will eventually lead to a deterioration in the actual transfer speed of the entire system.

Figure 12:
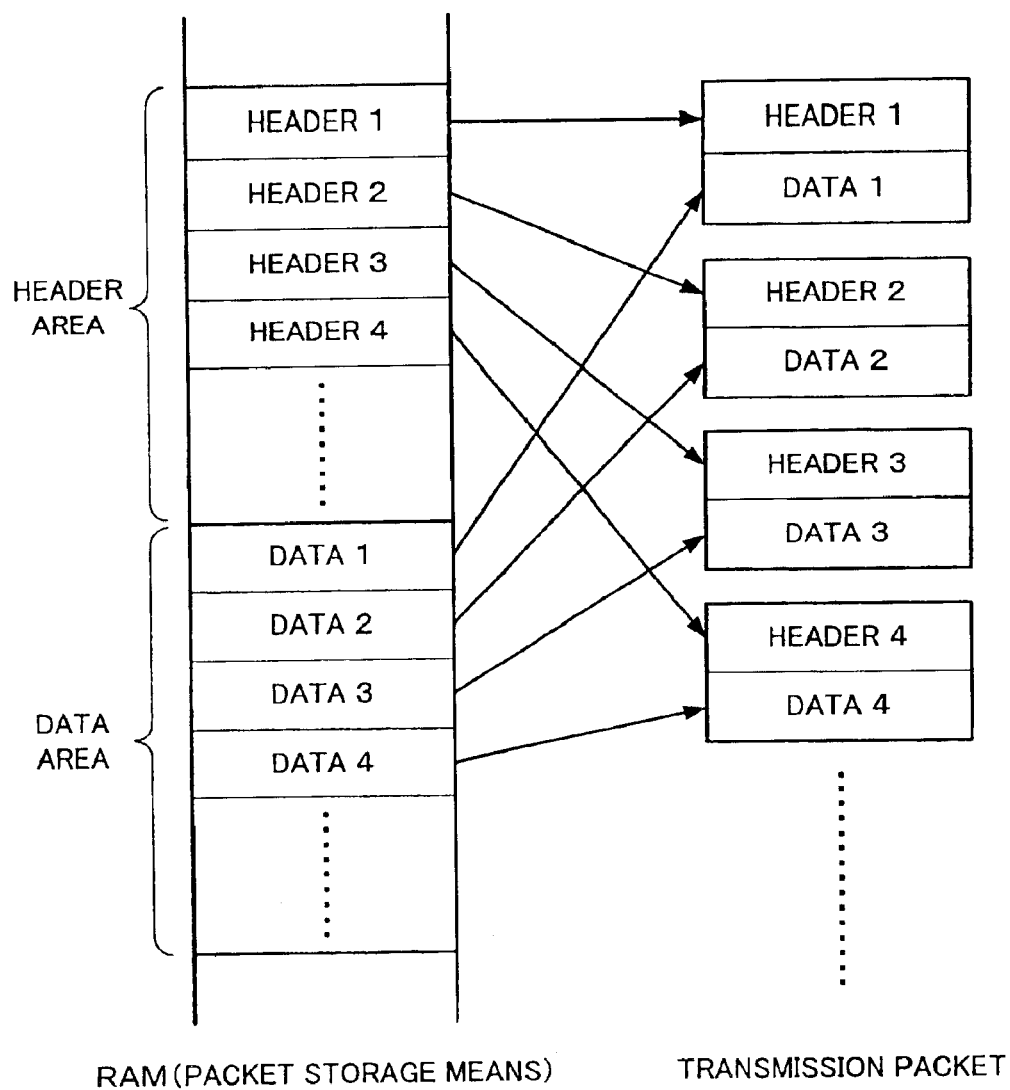
FIG. 12 is illustrative of a method in which a header stored in the header area is combined with data stored in the data area, to assemble a send packet.

In contrast thereto, the storage area of the RAM 80 in the embodiment shown in FIG. 6 is divided into a header area and a data area. More specifically, a header stored in the header area is combined by the hardware with data stored in the data area, to assemble a send packet to be transferred to another node, as shown in FIG. 12. This ensures that the processing load on the CPU 66 is extremely small in comparison with the configuration of FIG. 8, which can improve the actual transfer speed of the entire system. In addition, since it is possible to employ an inexpensive device as the CPU 66 and it is also sufficient to use a low-speed bus for connection to the CPU 66, the data transfer control device and electronic equipment can be made more compact, at a lower cost.

With this embodiment of the invention, headers are stored together in the header area and data is stored together in the data area. It is therefore possible to simplify the read and write processing of headers and data, enabling a reduction in processing overheads. Taking data transfer by the method of FIG. 11 by way of example, the data transfer can be controlled by having the CPU 66 access only the header area through the CPU bus 96, to read and write headers. The application-layer device 124 can also read out the data continuously from the data area over the bus 90, and also write data continuously to the data area.

The process of linking the header and data of a packet in accordance with this embodiment is implemented as described below in more detail, by way of example.

In other words, a packet assembly circuit 280 within the DMAC 40 (broadly speaking, the read means) of this embodiment of the invention specifies a read address RADR. The header (broadly speaking, control information) of the packet is read from the header area (broadly speaking, the control information area) of the randomly accessible RAM 80 and the data that matches that header is read from the data area of the RAM 80. Thus the header and data are linked together to assemble a send packet. This send packet is transferred to the nodes through the FIFO 30, the link core 20 that provides various services for packet transfer, and the PHY chip.

Figure 13:
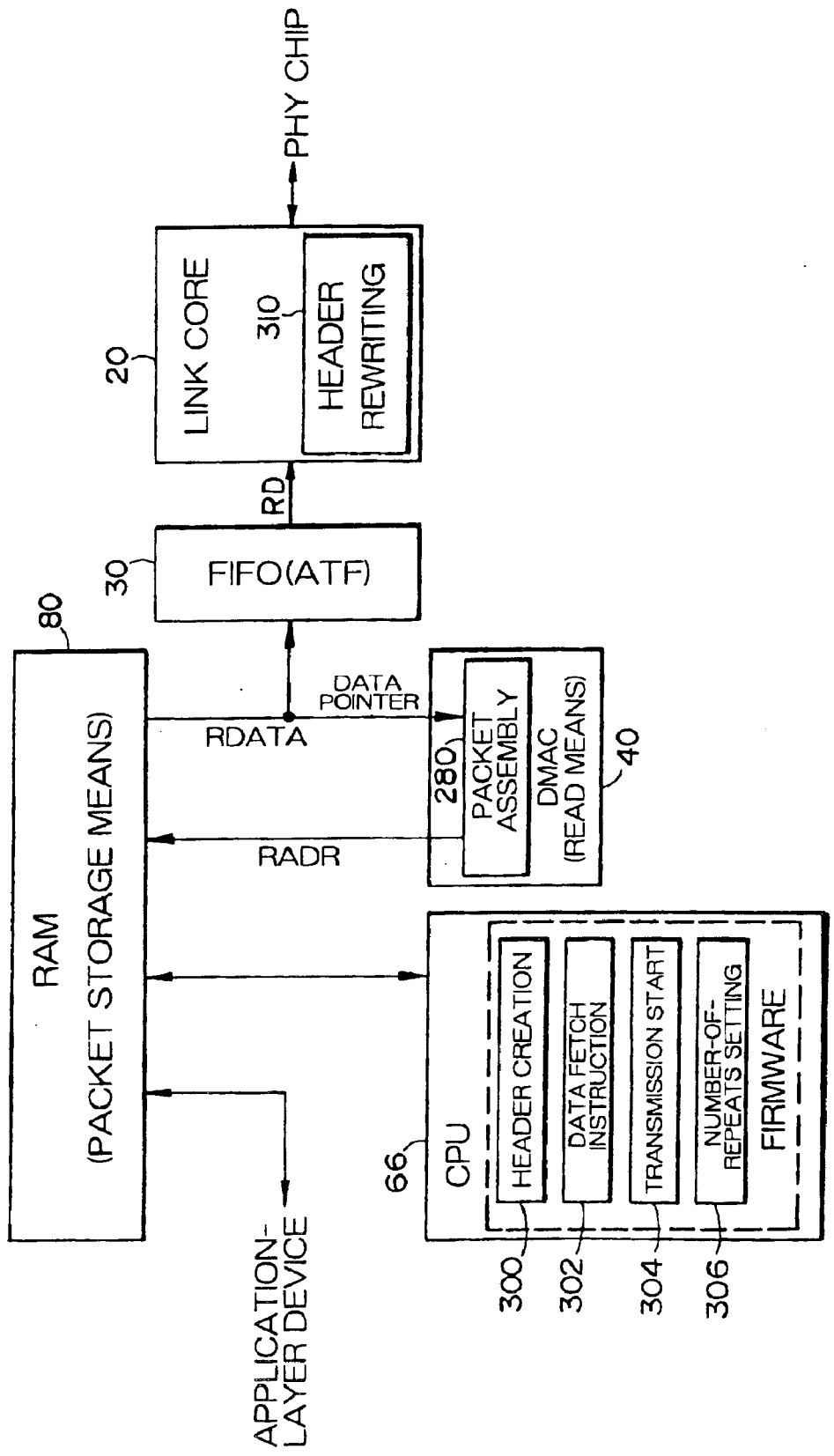
FIG. 13 is illustrative of a method in which a data pointer is obtained from a header that is read from RAM, and the thus obtained data pointer is used to link together the header and data of a packet.

In this case, header creation and writing to the header area is done by a header creation section 300 of the CPU 66. The fetching of data into the data area is done by means such as an application-layer device, in accordance with an instruction from a data fetch instruction section 302. A transmission start section 304 issues a transmission start instruction for the packet. Note that the functions of the header creation section 300, the data fetch instruction section 302, the transmission start section 304, and a number-of-repeats setting section 306 of FIG. 13 are implemented by the hardware and firmware of the CPU 66.

Figure 14:
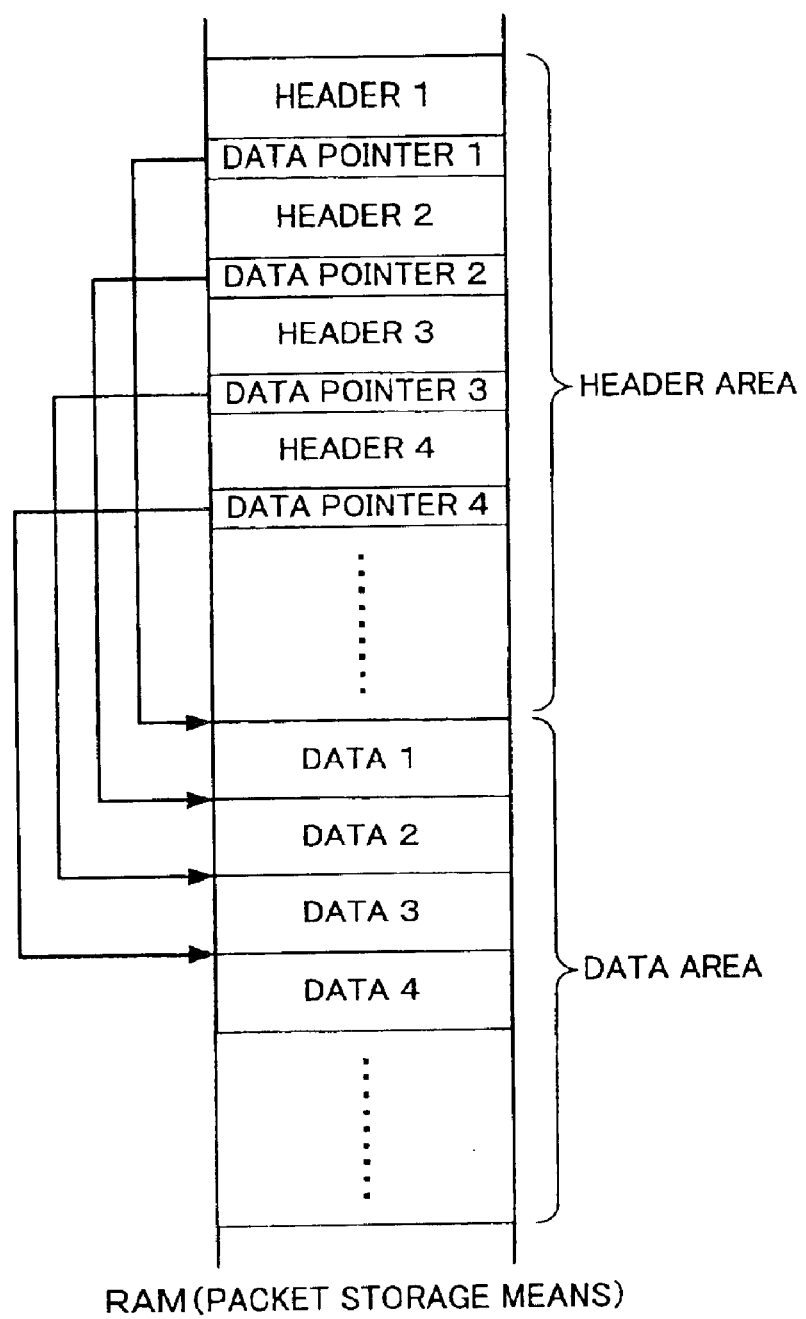
FIG. 14 is illustrative of a method in which data pointers W are comprised within headers stored in the header area.

Note also that a data pointer, which indicates a read address for data from the data area, is added by the header creation section 300 to each header in the header area, as shown in FIG. 14. The packet assembly circuit 280 of FIG. 13 obtains this data pointer from the header that was read from the header area as RDATA, then uses the thus obtained data pointer to read data from the data area. This makes it possible to simplify the read processing of the packet assembly circuit 280.

Figure 15A:
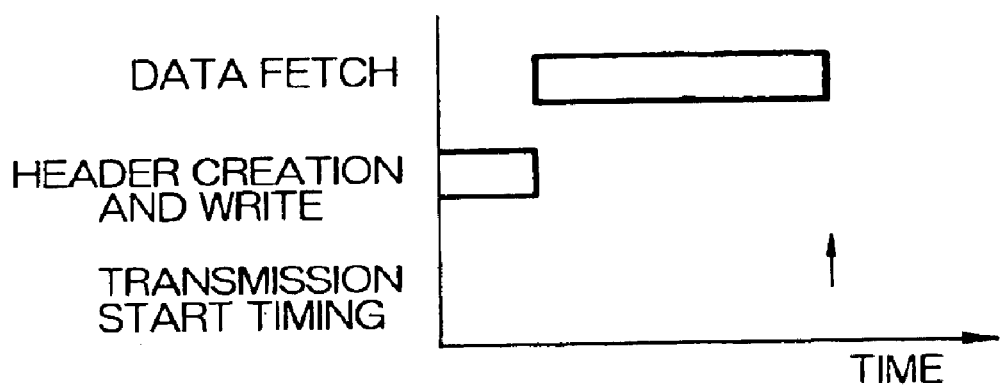
FIGS. 15A and 15B are illustrative of a method in which header creation and writing processing is done during data fetch processing.

With the configuration of FIG. 8, the send packet must be input to the FIFO in the sequence in which it is to be sent, that is, in the sequence of header then data. It is therefore not possible to send a packet without using a pattern in which the header is created and written by the firmware first, then data is fetched from the application-layer device, and finally the start of transmission is instructed, as shown in FIG. 15A. Thus it is not possible to implement higher processing speeds.

Figure 15B:
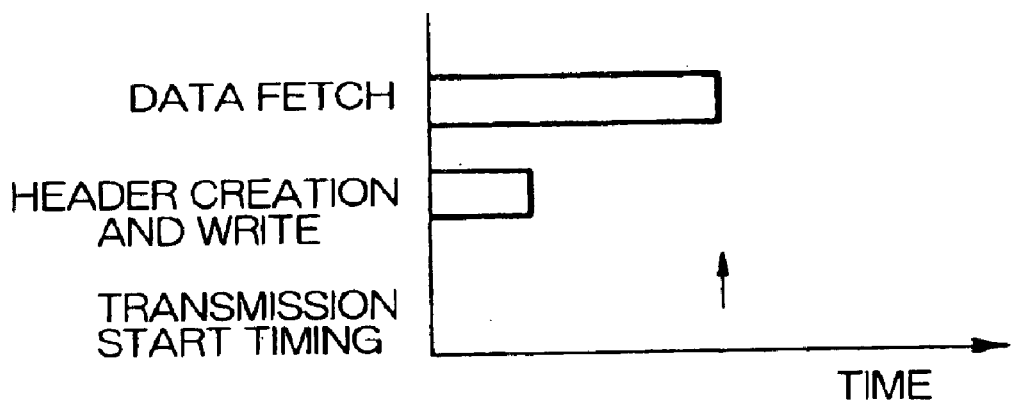

This embodiment of the invention, on the other hand, makes it possible for the firmware (the header creation section 300) to do the processing for creating the header and writing it to the header area, while data is being fetched from the application-layer device to the data area, as shown in FIG. 15B. The packet transmission start instruction is issued on condition that the firmware (the transmission start section 304) has completed both the processing for fetching the data and the processing for writing the header. The thus configure embodiment of the invention ensures that the processing load on the firmware is dramatically reduced and also that the processing is faster.

Note that a typical flowchart of the processing of the firmware of the comparative example is shown in FIG. 16A and a typical flowchart of the processing in the firmware of this embodiment of the invention is shown in FIG. 16B.

In FIG. 16A, after the firmware has created and written the header (step S1), it instructs the data fetch (step S2) and finally issues a transmission start instruction (step S3).

In FIG. 16B, on the other hand, the firmware first issues a data fetch instruction (step S11) alone, then it creates and writes the header (step S12). It then determines whether or not the data fetch has ended (step S13) and, if it has ended, it issues the transmission start instruction (step S14). This configuration makes it possible for the data fetch processing and the header creation and writing processing to proceed in parallel.

Figure 17:
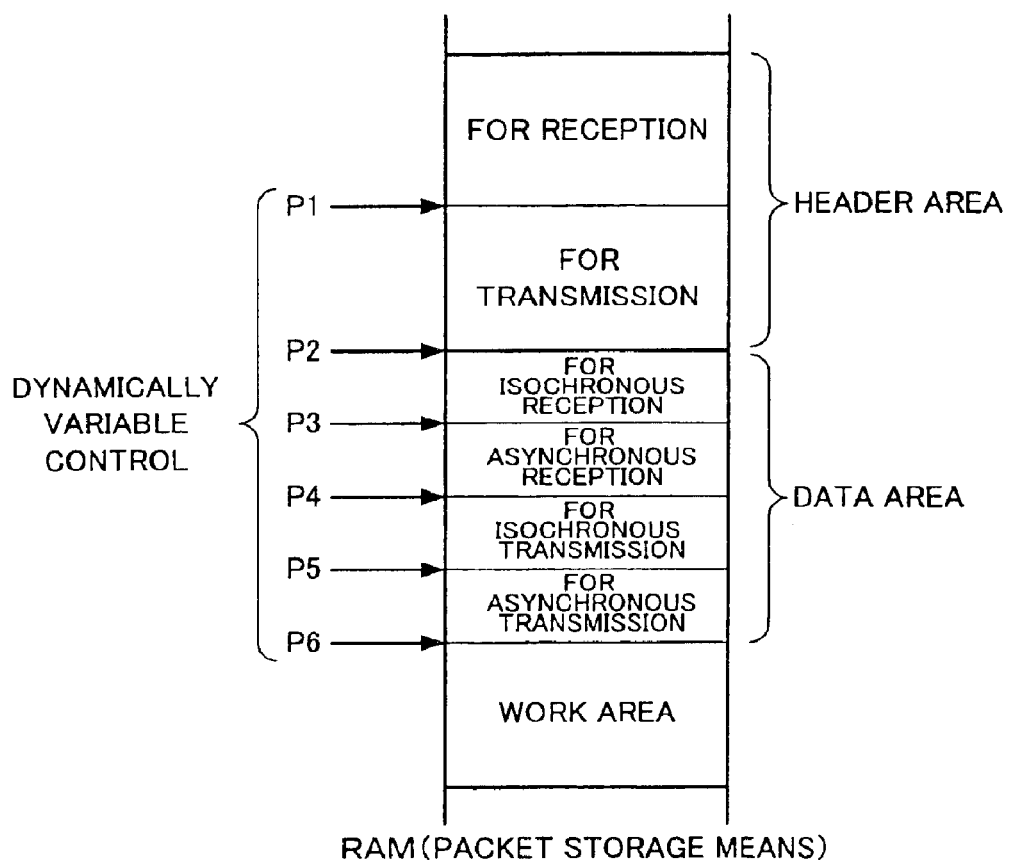
FIG. 17 is illustrative of a method in which the size of each area in RAM is controlled in a variable manner.

Note that the header area of the RAM 80 of this embodiment is preferably divided in separate areas for reception and transmission, as shown in FIG. 17. Similarly, the data area could be divided into areas for reception and transmission, as well as areas for isochronous transfer and asynchronous transfer. In addition to the header area and the data area, it is also preferable to provide a work area for the CPU 66 that is separated from those areas.

If the storage area of the RAM 80 is divided into a plurality of areas, moreover, it is preferable that the size of each area can be controlled in a variable manner. More specifically, pointers P1 to P6 that indicate the addresses of the boundaries of the areas can be controlled in a variable manner, as shown in FIG. 17. This makes it possible to implement the optimal area partitioning for each application. In this case, it is preferable that the size of each area in the RAM 80 can be controlled dynamically and in a variable manner after the power has been switched on. This makes it possible to increase the area for reception during reception processing or increase the area for transmission during transmission processing, thus making it possible to utilize limited resources efficiently.

Figure 18A:
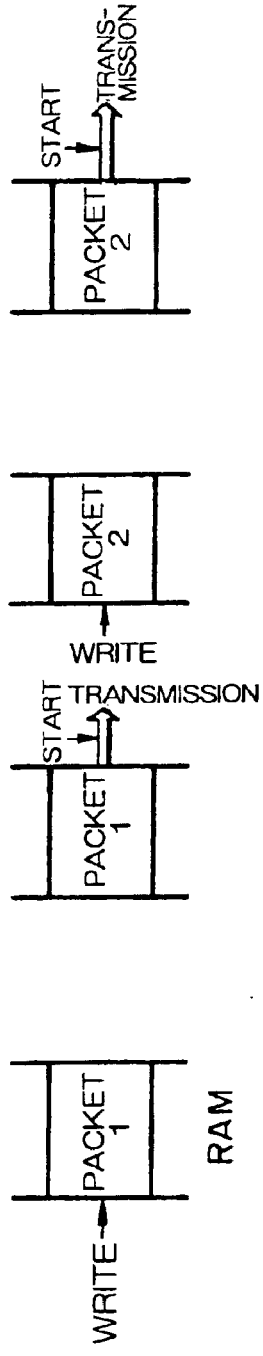
FIGS. 18A and 18B are illustrative of a method in which the send packet area is divided into a plurality of channels.

The send packet area provided in the RAM that is shown in FIG. 18A has only one channel. With the configuration shown in FIG. 18A, therefore, first of all a packet 1 is written (the header is created and written and data is fetched) in that one channel then, when this write ends, transmission start for packet 1 is instructed. A packet 2 is then written in the same channel and, when that write ends, transmission start for packet 2 is instructed.

Figure 18B:
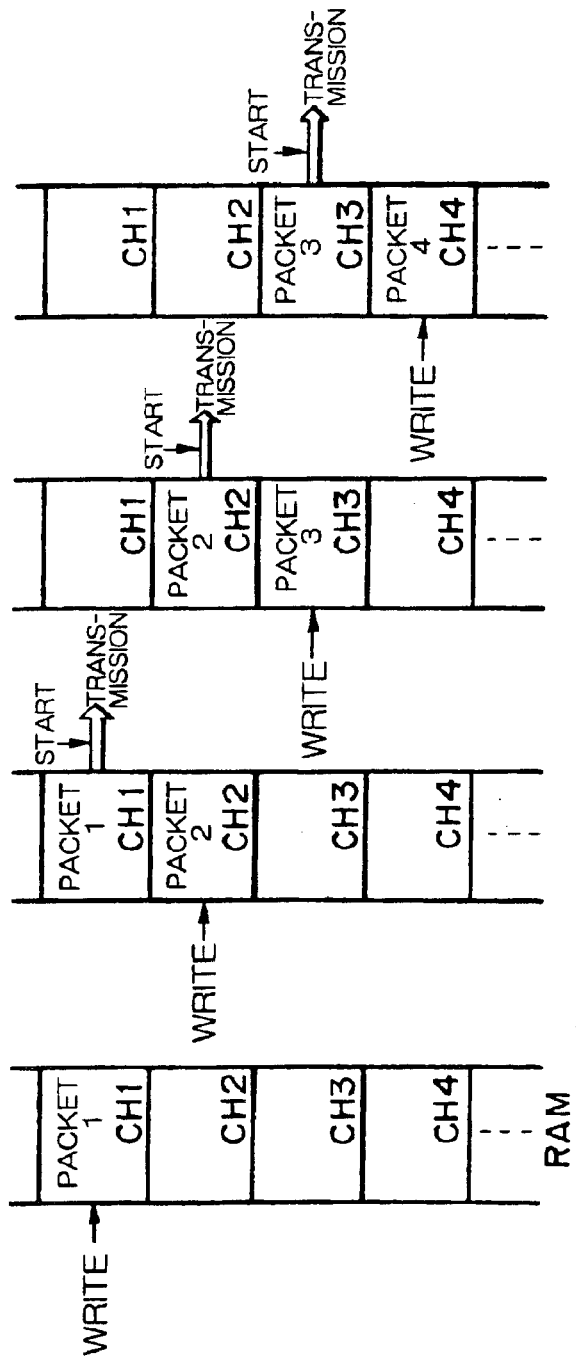

In contrast thereto, the send packet area in the RAM shown in FIG. 18B is divided into a plurality of channels. With the configuration shown in FIG. 18B, therefore, first of all a packet 1 is written then, when this write ends, transmission start for packet 1 is instructed. While packet 1 is being transmitted from channel 1 (CH1), a packet 2 is written in channel 2 (CH2) and, when that write ends, transmission start for packet 2 is instructed. In a similar manner a packet 3 is written in channel 3 (CH3) while packet 2 is being sent from channel 2, and a packet 4 is write in channel 4 (CH4) while packet 3 is being sent from channel 3.

Since the processes of writing and transmitting each packet are done sequentially in the configuration of FIG. 18A, there is wastage of processing time. In contrast thereto, the transmission processing (read processing) of a packet from one channel is done in parallel with the write processing of another packet to another channel. It is therefore possible to reduce wastage in processing time, thus making the processing faster.

The description now turns to details of packet transmission using a plurality of channels, with reference to FIGS. 19, 20A, 20B, 21A, and 21B.

Figure 19:
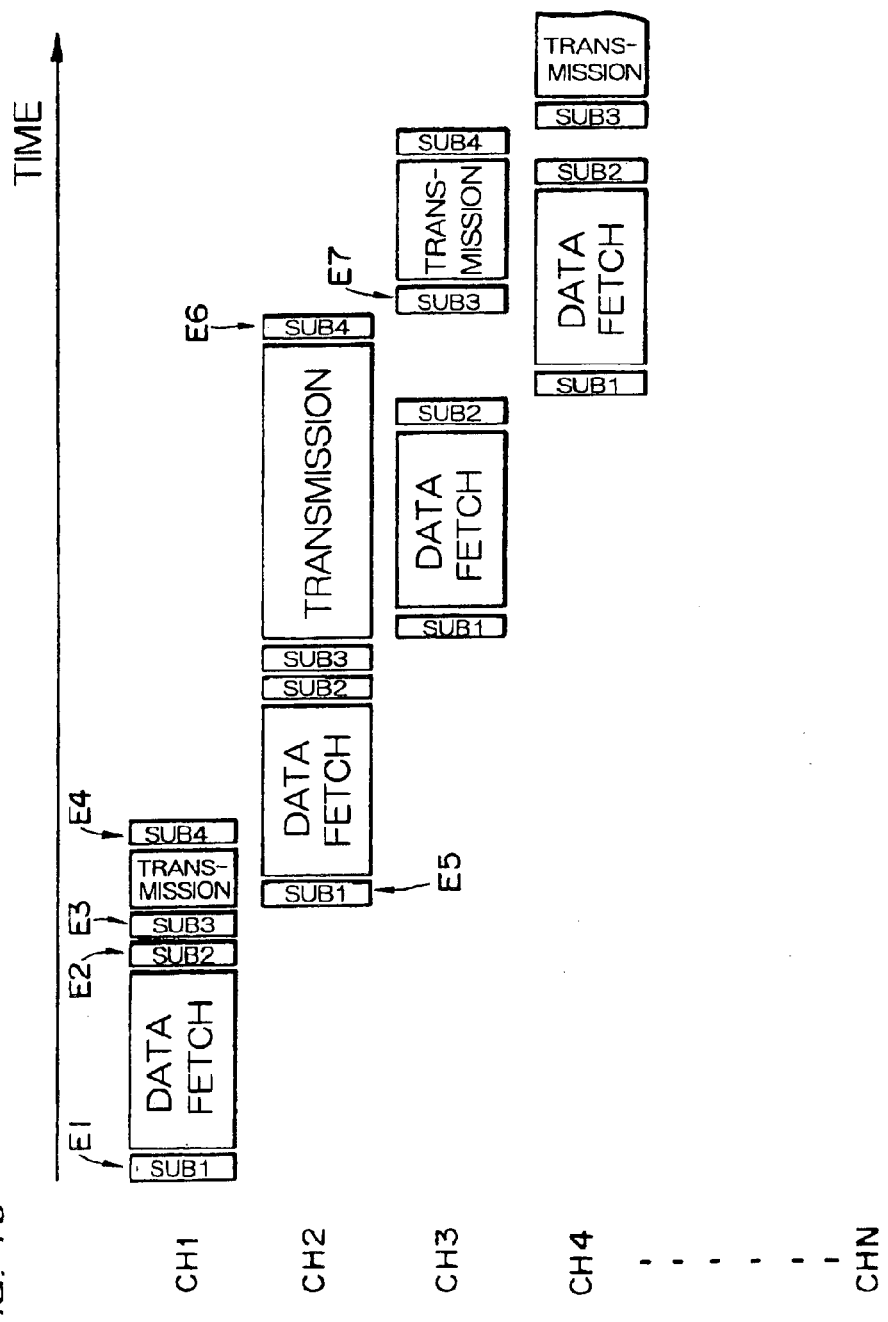
FIG. 19 is illustrative of a method of firmware processing when the send packet area has been divided into a plurality of channels.

SUB1, SUB2, SUB3, and SUB4 in FIG. 19 are subroutines 1, 2, 3, and 4, which are shown in FIGS. 20A, 20B, 21A, and 21B, respectively. All of SUB 1 to SUB 4 branch off of a single main routine.

First of all, SUB1 is executed in channel 1, as shown at E1 in FIG. 19. The processing of SUB1, shown in FIG. 20A, determines whether or not a data-fetch-in-progress flag is set (step T11) then, if it is not set, checks whether or not there is a space in the data area (step T12). If the data area is empty, it instructs a data fetch (step T13). This fetches data from an application-layer device or the like to the RAM. After data fetch has been instructed, the data-fetch-in-progress flag is set (step, T14).

The processing of SUB2, shown in FIG. 20B, first determines whether or not the data-fetch-in-progress flag is set (step T21). At E2 in FIG. 19 the data-fetch-in-progress flag is set, as the data-fetch-in-progress flag has been set in step T14 (FIG. 20A) in SUB1 at E1 of FIG. 19. The processing therefore proceeds to the next step, and determines whether or not the data fetch has ended (step T22). Since the data fetch has ended at E2 of FIG. 19, the processing moves on to the next step and sets a transmission-enabled flag for channel 1 (step T23). This transmission-enabled flag differs from the previously described data-fetch-in-progress flag and a transmission-in-progress flag, which will be described later, in that one such flag is provided for each channel. After the transmission-enabled flag has been set, the data-fetch-in-progress flag is cleared (step T24).

The processing of SUB3, shown in FIG. 21A, first determines whether or not the transmission-in-progress flag is set (step T31) then, if it is not set, checks whether or not the transmission-enabled flag is set (step T32). At E3 of FIG. 19 the transmission-enabled flag is set, as the transmission-enabled flag has been set at step T23 (FIG. 20B) in SUB2 at E2 of FIG. 19. The processing thus proceeds to the next step and instructs transmission start (step T33). After the transmission start instruction, the transmission-in-progress flag is set (step T34).

The processing of SUB4, shown in FIG. 21B, first determines whether or not the transmission-in-progress flag is set (step T41). At E4 of FIG. 19 the transmission-in-progress flag is set, as the transmission-in-progress flag has been set at step T34 (FIG. 21A) in SUB3 at E3 of FIG. 19. The processing thus proceeds to the next step and determines whether or not transmission has ended (step T42). Since transmission has already ended at E4 of FIG. 19, the processing moves on to the next step and clears the transmission-enabled flag and the transmission-in-progress flag (steps T43 and T44).

In SUB2 at E2 in FIG. 19, the transmission-enabled flag is set on condition that the data fetch has ended, as shown in steps T22 and T23 of FIG. 20B. Similarly, in SUB3 at E3, transmission from a channel is started on condition that the transmission-enabled flag of that channel has been set, as shown in steps T32 and T33 of FIG. 21A. In other words, the provision of a transmission-enabled flag for each channel makes it possible to start transmission for that channel on condition that the data fetch for that channel has ended.

In SUB2 at E2 in FIG. 19, the data-fetch-in-progress flag is cleared on condition that the data fetch has ended, at T22 and T24 of FIG. 20B. If the data-fetch-in-progress flag is cleared (if it is not set) in this manner, SUB1 at E2 can instruct the data fetch (steps T11 and T13 of FIG. 20A). In other words, it is possible to avoid a situation in which data is fetched for one channel while it is still being fetched for another channel, by using this data-fetch-in-progress flag.

In SUB4 at E6 of FIG. 19, the transmission-in-progress flag is cleared on condition that the transmission has ended, as shown in steps T42 and T44 of FIG. 21B. If the data-fetch-in-progress flag is cleared (if it is not set) in this manner, SUB3 at E7 can instruct the transmission start (steps T31 and T33 of FIG. 21A). In other words, it is possible to avoid a situation in which data is being transmitted for one channel while it is still being transmitted for another channel, by using this transmission-in-progress flag.

As described above, it is possible to transmit packets from a plurality of channels in a multi-tasking manner, using one program (firmware) that consists of a main routine and four subroutines SUB1 to SUB4.

Figure 22A:
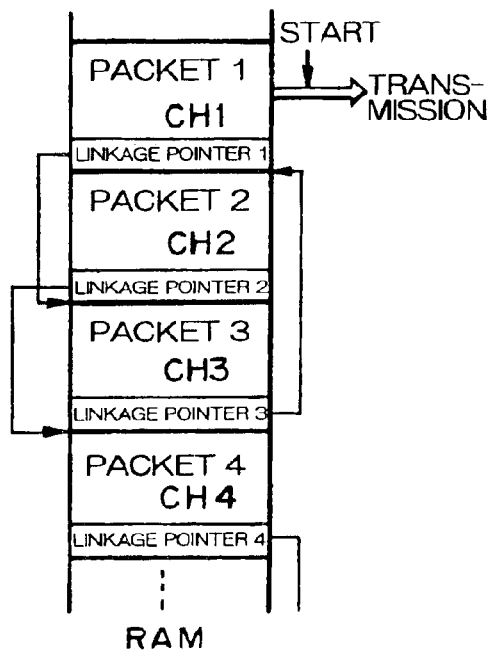
FIGS. 22A, 22B, 22C, and 22D are illustrative of a method in which linkage pointers are used.
Figure 22B:
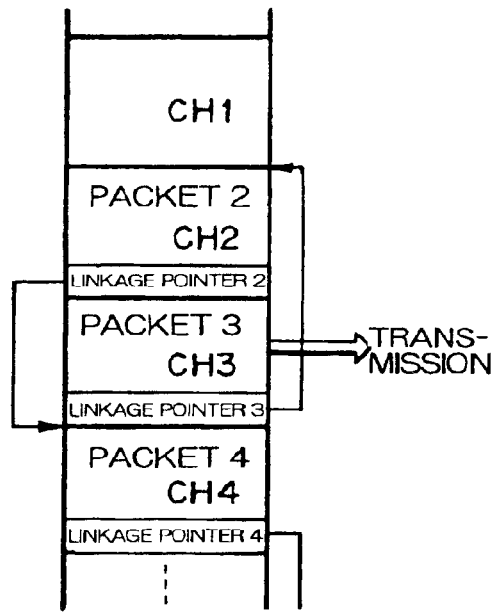
Figure 22C:
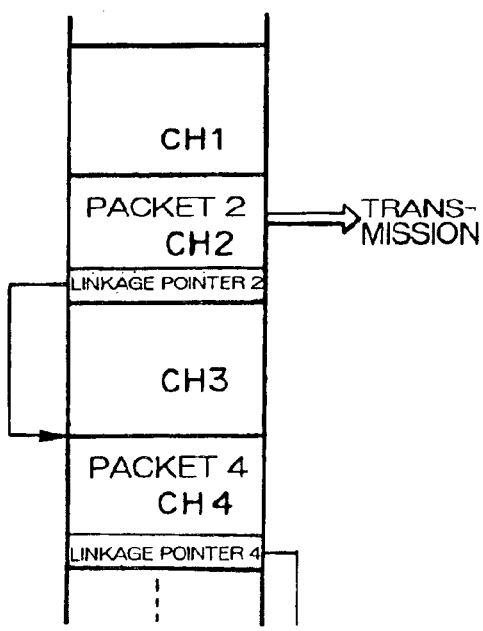
Figure 22D:
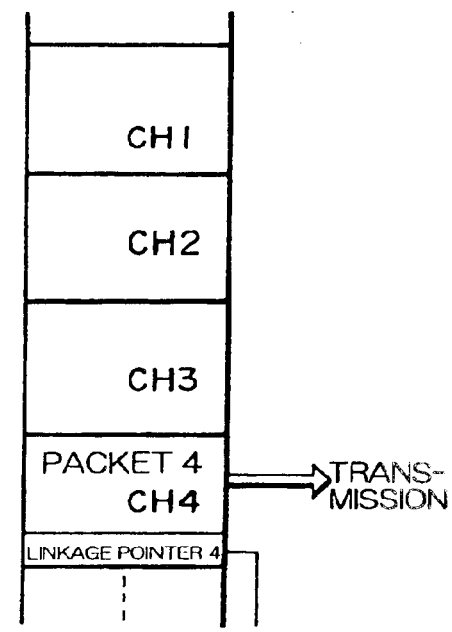

Note that it is preferable to have linkage pointers for linking together related packets, for packet transfer through a plurality of channels. Assume that packets 1 and 3, 2 and 4, and 3 and 2 are linked together by linkage pointers 1, 2, and 3, as shown by way of example in FIG. 22A. If the start of transmission of packet 1 is instructed, packet 3 is read in accordance with linkage pointer 1 and packet 3 is transmitted as shown in FIG. 22B. If packet 3 is sent, packet 2 is read in accordance with linkage pointer 3, and packet 2 is transmitted, as shown in FIG. 22C. If packet 2 is sent, packet 4 is read in accordance with pointer 2, and packet 4 is transmitted, as shown in FIG. 22D.

This configuration ensures that the firmware can simply instruct the start of transmission of a packet from one channel, which will cause a packet of another channel to be read in sequence. It is therefore not necessary for the firmware to instruct the start of transmission of a packet of another channel. As a result, he processing load on the firmware can be dramatically reduced.

Figure 23A:
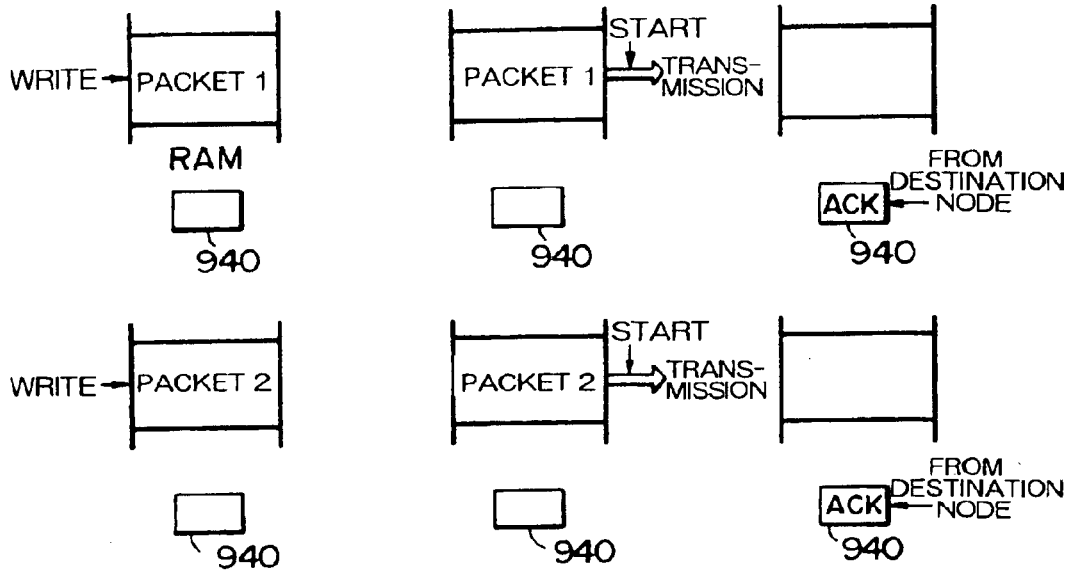
FIGS. 23A, 23B, and 23C are illustrative of a method in which an ACK code is written back to the channel that is the transmission originator of each packet.

Under IEEE 1394, when a source node transfers a packet, as described with reference to FIG. 1A, the destination node returns an ACK code. In this case, the details of this ACK code are preferably stored in some sort of storage means in such a manner that the firmware of the source node can confirm them. A four-bit ACK code that is returned in answer to the transmission of packet 1 is stored in a register 940, as shown in FIG. 23A. When an ACK code is returned in answer to the transmission of packet 2, the ACK code for that packet 2 is overwritten into the register 940. In other words, the ACK code in the register 940 is always updated to the latest version.

When a plurality of packets have been sent in sequence by the method of FIG. 23A, however, it is no longer clear which packet's code is stored in the register 940. This is because the register 940 can only store one AC code at a time.

One method of avoiding this problem that could be considered is to ensure that the firmware instructs the start of transmission of packet 2 after reading and confirming the ACK code that was returned in answer to the transmission of packet 1, from the register 940. However, this method means that the firmware has to wait until the ACK code for packet 1 has been returned, before issuing the instruction for the start of transmission of packet 2. This hinders any speed-up of the processing. This is particularly true when a plurality of channels are used for transferring packets, because it makes it impossible to utilize the advantages provided by this plurality of channels.

Figure 23B:
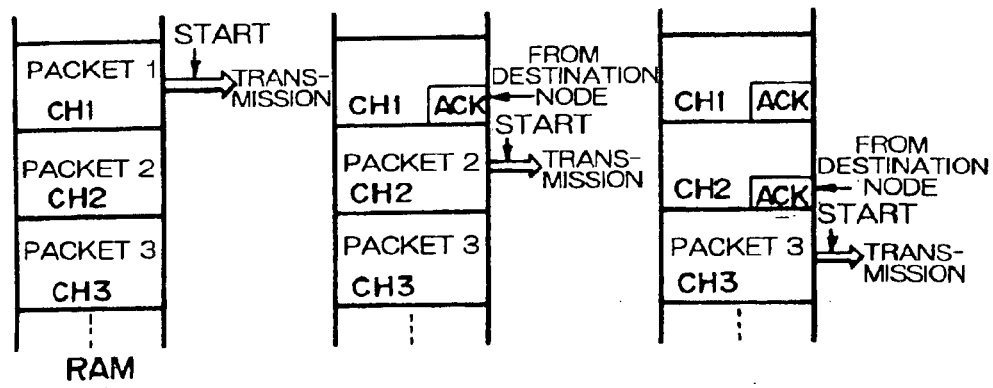

In another method shown in FIG. 23B, ACK code (acknowledgment information) that has been sent from the transfer destination (destination node) of the packet is written back into the channel that is the transmission originator of that packet, among the plurality of channels for the send packet area. In other words, an ACK that is returned for the transmission of packet 1 from channel 1 is written back to channel 1, and an ACK that is returned for the transmission of packet 2 from channel 2 is written back to channel 2, as shown in FIG. 23B.

This configuration ensures that there is a one-to-one correspondence between packets and ACK codes that are sent, which makes it possible for the firmware to confirm which ACK code has been returned for which packet, in a simple and reliable manner.

In addition, the firmware can instruct the start of transmission of packet 2 without confirming that an ACK code has been returned for the transmission of packet 1, and confirm that ACK code later. In other words, it can instruct the start of transmission as soon as the preparations for transmission (header creation and writing, and data fetch) are completed, then confirm the ACK codes whenever there is spare time. This configuration makes it possible to increase the processing speed even further.

Figure 23C:
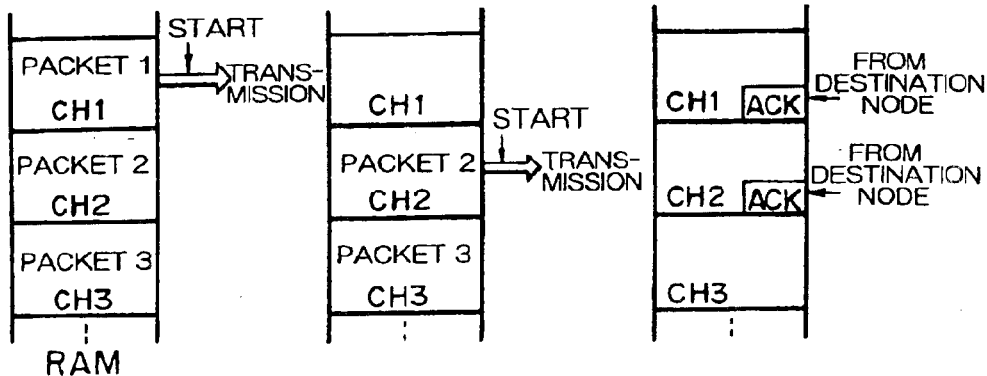

Note that it is particularly preferable to use this method of writing the ACK code for each packet back into the channel that sent that packet, as shown in FIGS. 23B and 23C, from the viewpoints of simplifying the hardware, reducing the processing load on the firmware, and increasing the processing speed. However, this embodiment is not limited to the method shown in FIGS. 23B and 23C. In other words, the apparatus could be provided with means for storing at least the same number of ACK codes that are sent from packet transfer destinations as packets that can be transferred in series, without confirming those ACK codes. If the number of packets that can be transferred in series without any verification of ACK codes is four, by way of example, the apparatus is provided with a register that can contain at least four ACK codes (a register of at least 16 bits). The configuration is preferably such that it is possible to confirm that ACK codes have been returned, regardless of the sequence in which they arrive. This configuration makes it possible to maintain the correspondence between packets and ACK codes, even when packets are transferred in series.

Figure 24A:
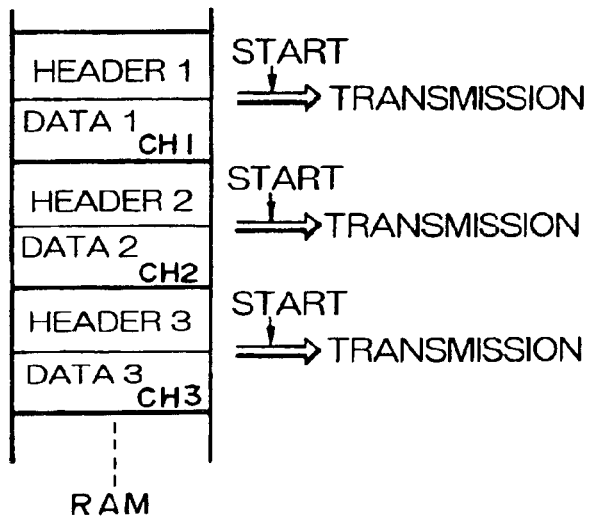
FIGS. 24A and 24B are illustrative of a method in which a basic header is rewritten to enable the transfer of a series of packets.

As shown in FIG. 24A, packets 1, 2, and 3 are sent in such a manner that packet 1 (header 1, data 1) is written to RAM, the start of that transmission is instructed, packet 2 (header 2, data 2) is written, the start of that transmission is instructed, then packet 3 (header 3, data 3) is written, and the start of that transmission is instructed.

However, if packets 1, 2, and 3 are the same type of packet and headers 1, 2, and 3 are similar (if a large amount of data is divided into a plurality of payloads for transfer, for example), the method of FIG. 24A leads to a certain amount of wastage in the firmware's header creation processing, and also the storage area in RAM will be used inefficiently. In addition, the firmware has to issue the transmission start instruction three times, in order to send packets 1, 2, and 3. The method of FIG. 24A therefore increases the processing load on the firmware and also makes it impossible to use limited resources efficiently.

Figure 24B:
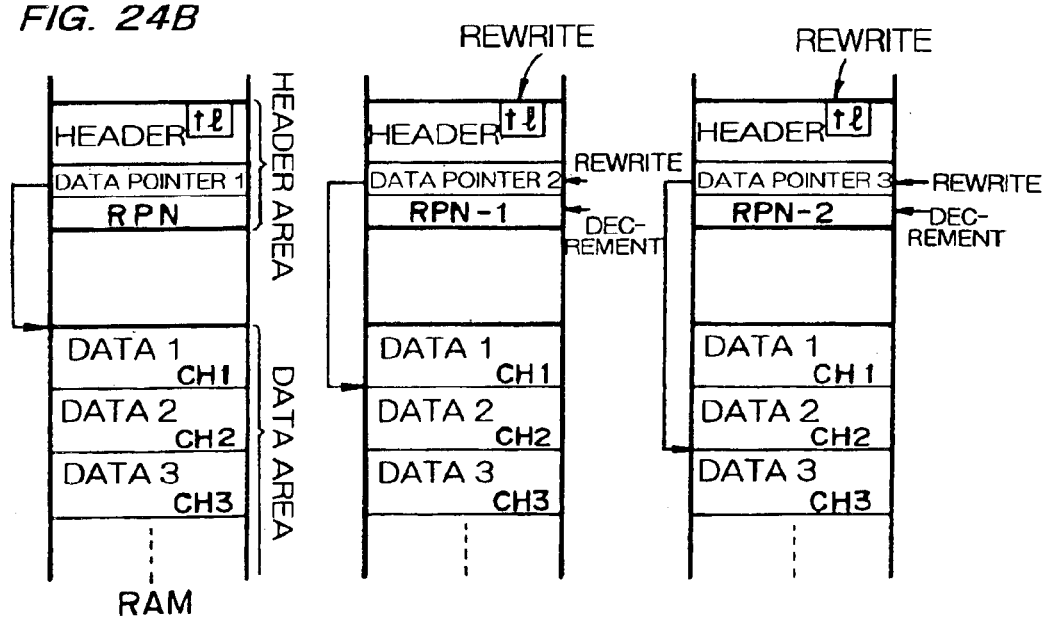

In contrast thereto, the method of FIG. 24B enables the header creation section 300 (firmware) of FIG. 13 to create a single header to act as a basic header. This basic header comprises fields such as a data pointer, RPN, and tl, as shown in FIG. 24B.

In this case, the data pointer indicates an address for data to be read from the data area. RPN is number-of-transmission-repeats information that is set by the number-of-repeats setting section 306 of FIG. 13. And tl is a transaction label which is standardized by IEEE 1394 as information for identifying transactions from each node. The responding side must include the same transaction label as that comprised within a packet from the requesting side, for return to the requesting side. It is therefore necessary to include tl rewrite processing for each transaction.

Every time the transmission start section 304 of FIG. 13 instructs the start of transmission, a header rewriting circuit 310 sequentially rewrites the basic header, as shown in FIG. 24B. In other words, it rewrites the data pointer and tl of the basic header, while decrementing or incrementing (broadly speaking, updating) RPN of the basic header. This rewriting is done until RPN reaches a given value, such as zero, by way of example. This rewriting of the basic header ensures that headers that correspond to the data of a packet that is to be transferred in series can be created sequentially for each packet. This configuration makes it possible to dramatically reduce the processing load on the firmware and also reduce the size of the storage area that is taken up by headers.

Figure 25A:
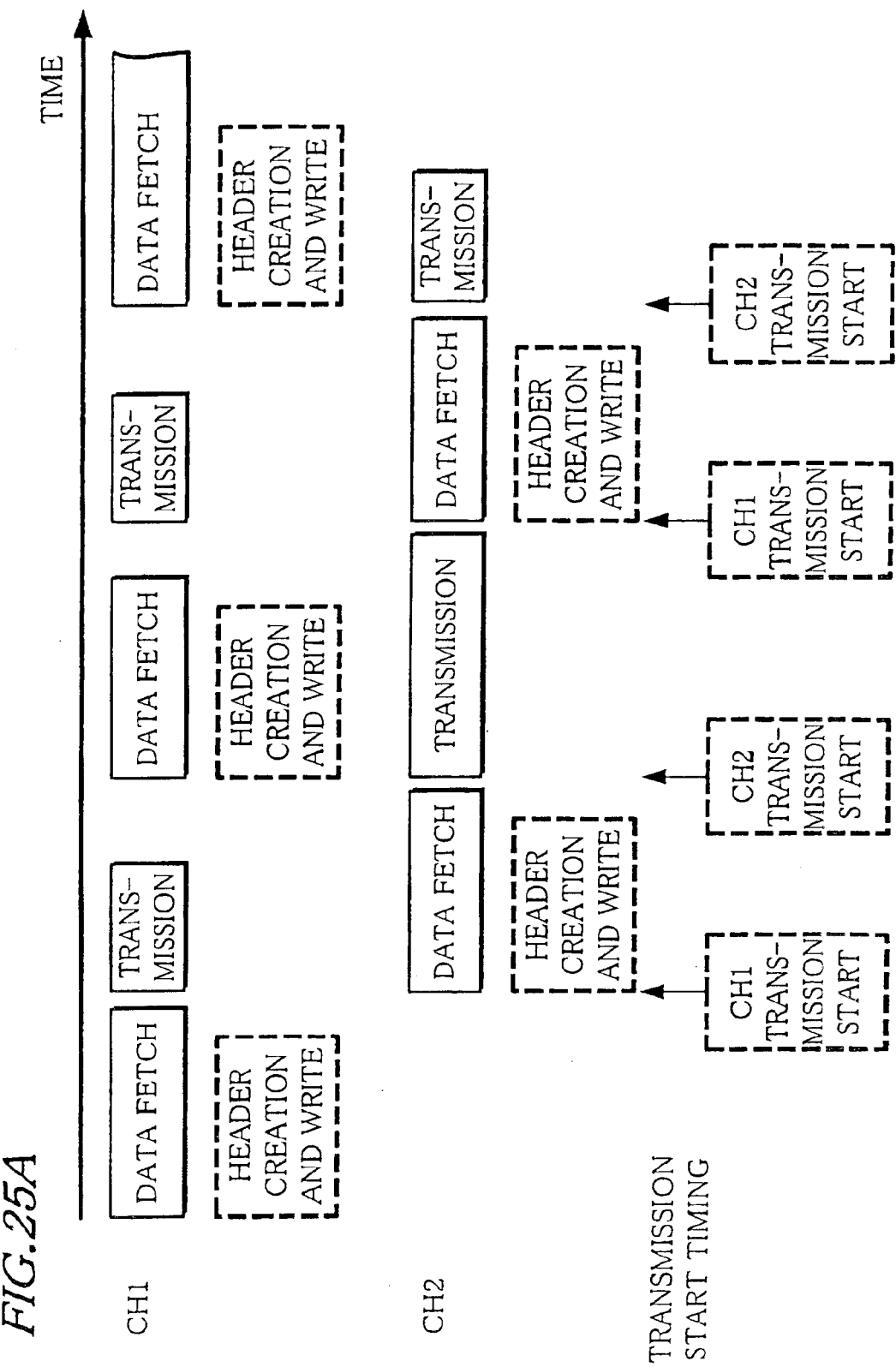
Figure 26:
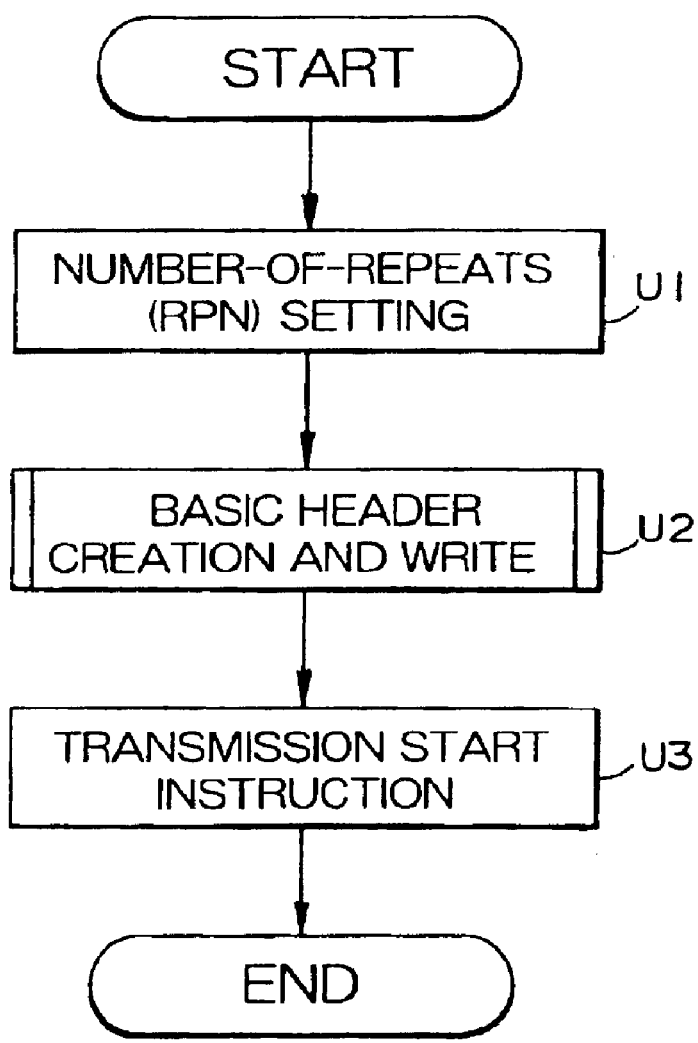
FIG. 26 is a flowchart illustrating the processing of firmware when a basic header is rewritten and packets are transferred in series.

In the method shown in FIG. 24A, by way of example, the firmware must create and write a header and instruct the start of transmission for every packet to be sent. In contrast thereto, the method of FIG. 24B ensures that, provided the firmware initially sets RPN (step U1), creates and writes the basic header (step U2), then instructs the start of transmission (step U3), the process of rewriting the basic headers, fetching the data, and transmitting the packets can then be repeated automatically. Thus the processing load on the firmware can be reduced in comparison with the configuration of FIG. 25A.

Note that it is also possible to store the number-of-transmission-repeats information RPN in a given register or the like, instead of including it in the basic header.

3.2 Configuration

Figure 27:
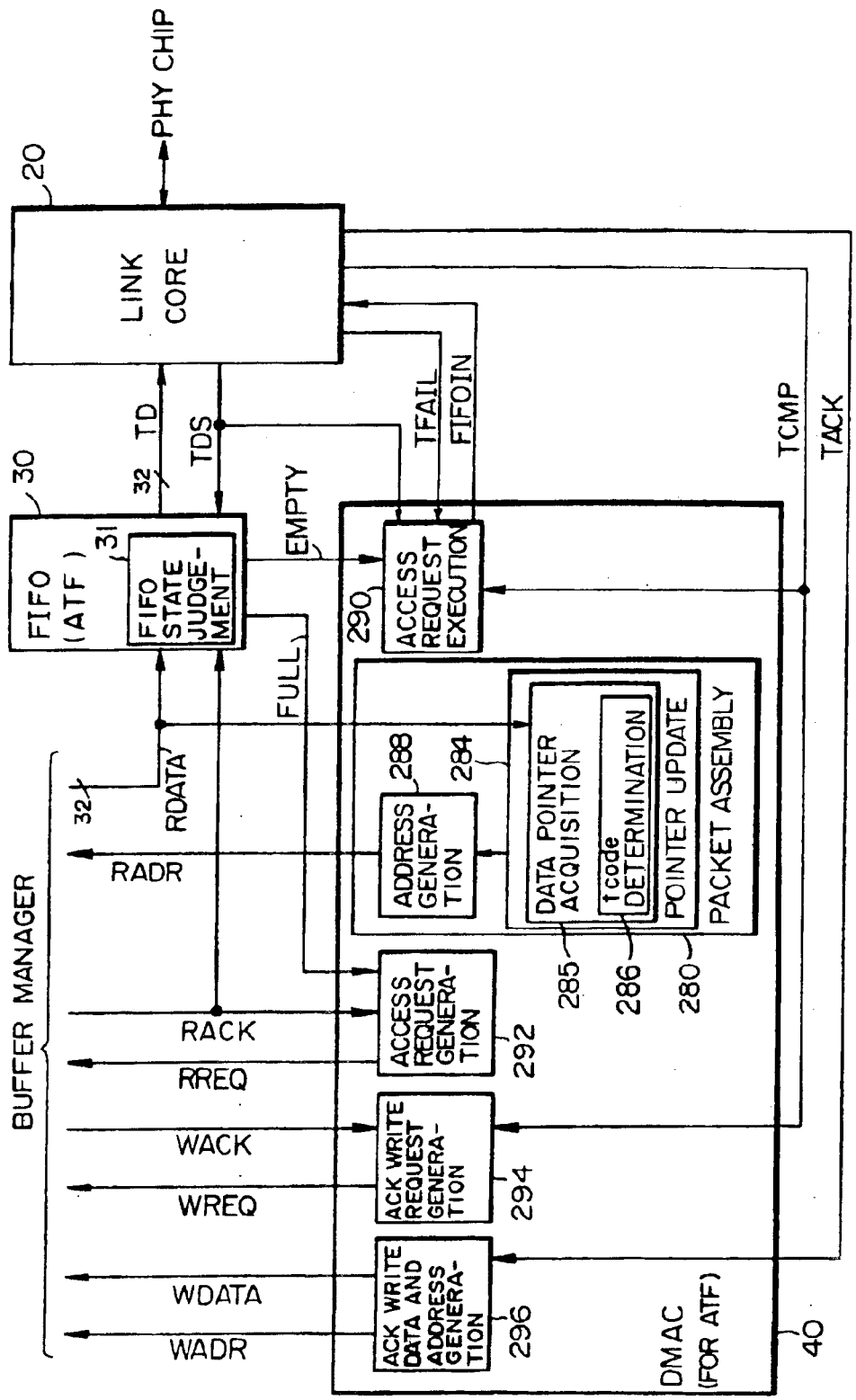
FIG. 27 shows an example of the configuration of the transmission side.

The configuration on the transmission side is described below. A detailed example of the configuration of the FIFO 30 and the DMAC 40 is shown in FIG. 27.

The FIFO 30 functions as a buffer for phase adjustment and comprises a FIFO state judgement circuit 31. The FIFO state judgement circuit 31 makes an EMPTY signal go active when the FIFO is empty and a FULL signal go active when the FIFO is full.

The DMAC 40 comprises the packet assembly circuit 280, an access request execution circuit 290, an access request generation circuit 292, an ACK write request generation circuit 294, and an ACK write data and address generation circuit 296.

The packet assembly circuit 280 reads a header from the header area of the RAM 80 and data from the data area thereof, and assembles a send packet having a frame made up of this header and data (see FIG. 12). The packet assembly circuit 280 comprises a pointer update circuit 284 and an address generation circuit 288.

The pointer update circuit 284 updates a header pointer (broadly speaking, a control information pointer) and a data pointer used for reading out headers and data from the RAM 80, and it comprises a data pointer acquisition circuit 285. The data pointer acquisition circuit 285 acquires a data pointer from RDATA that has been read out from the RAM 80, and it comprises a tcode determination circuit 286 (tcode means transaction code, which is, broadly speaking, packet format identification information). The tcode determination circuit 286 identifies the tcode, and the fact that either the header or the data of the packet has been read can be determined by identifying this tcode.

The address generation circuit 288 receives outputs such as that from the pointer update circuit 284, and issues a read address RADR for the RAM 80.

If the EMPTY signal from the FIFO state judgement circuit 31 is active, the access request execution circuit 290 makes a FIFOIN signal active. The link core 20 makes TDS, which is a strobe signal for TD (TxData), go active on condition that FIFOIN is not active.

Note that TFAIL is a signal used by the link core 20 to inform the access request execution circuit 290 that a transmission has failed.

The access request generation circuit 292 receives RACK (which is an acknowledgment read out from the buffer manager 70) and FULL from the FIFO state judgement circuit 31, and outputs RREQ (which is a read request) to the buffer manager 70.

The ACK write request generation circuit 294 receives TCMP from the link core 20 and WACK from the buffer manager 70, and outputs WREQ to the buffer manager 70. The ACK write data and address generation circuit 296 receives TACK from the link core 20, outputs the write-back ACK code for the send packet as WDATA, and outputs the write-back address for ACK code as WADR.

3.3 Transmission-Side Operation

The operation of the transmission side will now be described with reference to the timing waveform chart of FIG. 28.

The description first concerns the operation of the link core 20.

Figure 28:
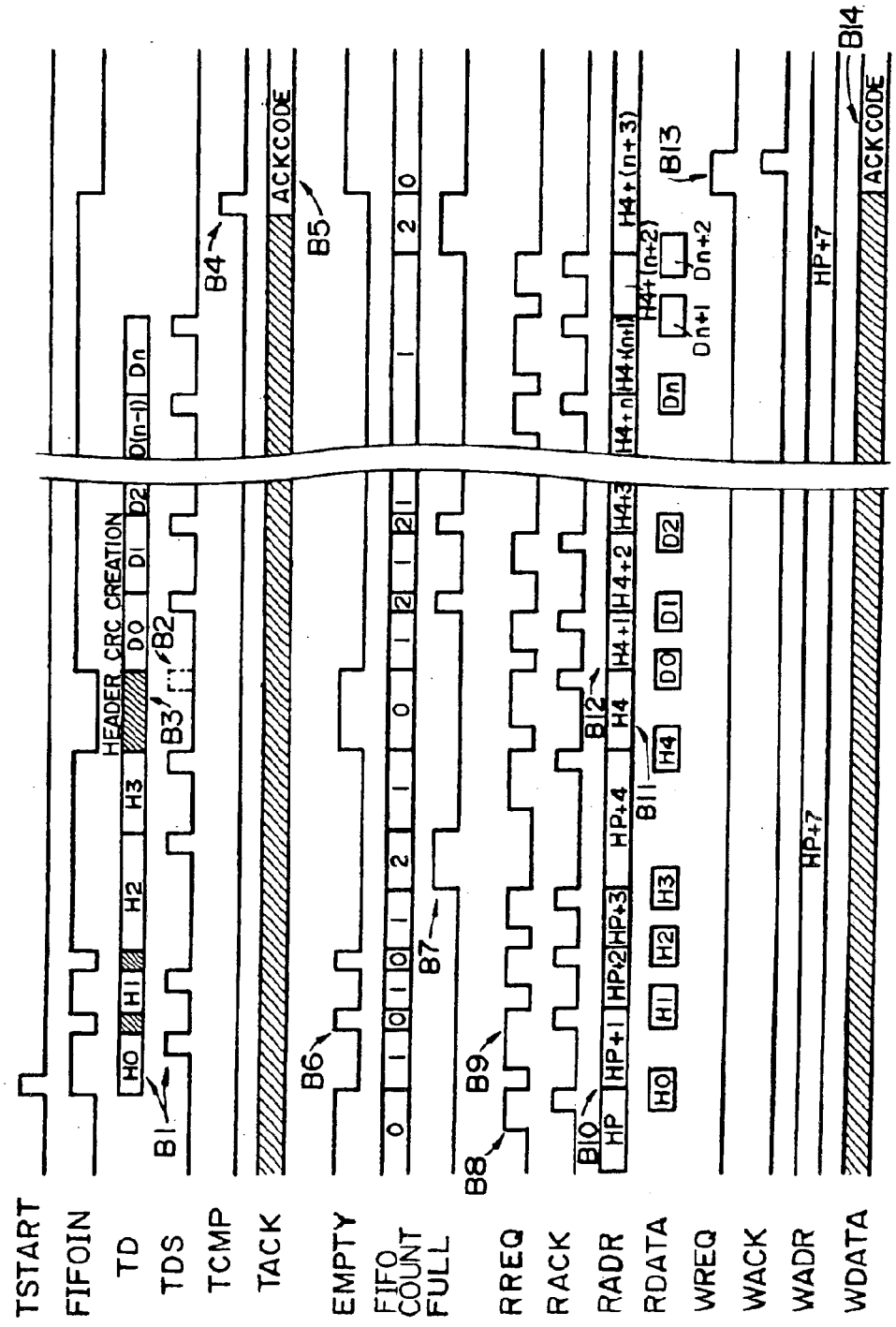
FIG. 28 is a timing waveform chart illustrating the operation of the transmission side.

When TSTART (which posts the start of transmission) goes active, the link core 20 uses the strobe signal TDS to fetch TD from the FIFO 30, as shown at B1 in FIG. 28. In this case, TD is fetched into the link core 20 in the sequence: header (H0 to H3) then data (D0 to Dn).

Figure 29A:
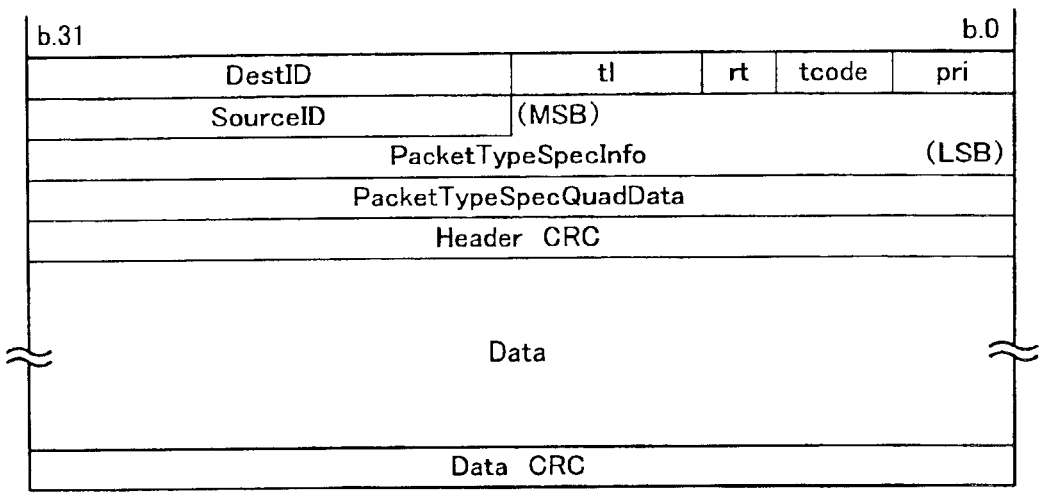
FIG. 29A shows the format of an asynchronous packet in accordance with the IEEE 1394 standard and FIG. 29B shows the format of the header portion of an asynchronous receive packet stored in the header area of RAM.
Figure 29B:
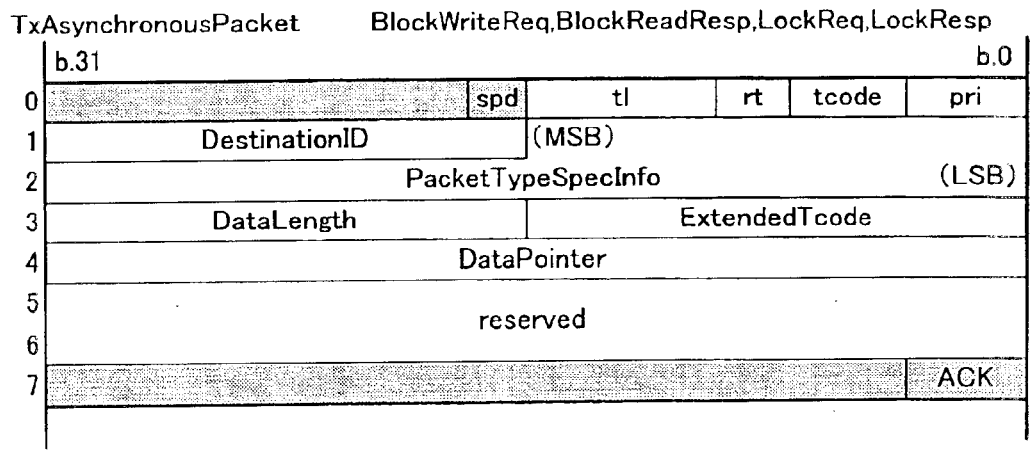

Note that the format (IEEE 1394 standard) of the asynchronous packet to be transferred over the serial bus is shown in FIG. 29A. The format of the header portion of an asynchronous send packet stored in the header area of the RAM 80 is shown in FIG. 29B. As shown in that figure, the fourth quadlet of the header forms a data pointer.

The link core 20 prevents TDS from going active at the position indicated by B2 in FIG. 28. Therefore, the fourth quadlet H4 of the header is not fetched into the link core 20, as shown at B3. This is because the fourth quadlet H4 is the data pointer, as shown in FIG. 29B, and the link core 20 does not need this data pointer. The link core 20 executes processing for creating the header CRC (see FIG. 29A) for attaching the header, during the period B3.

When the transmission processing for one packet ends, the link core 20 makes TCMP go active as shown at B4. The ACK code (see FIGS. 1A, 23B, and 23C) that has been returned from the destination node of the transmission through the PHY chip is output to the DMAC 40 as TACK, as shown at B5. This ACK code is then written back to the header stored in the header area of the RAM 80 (see the seventh quadlet of FIG. 29B), by the ACK write request generation circuit 294 and the ACK write data and address generation circuit 296.

The description now turns to the operation of the FIFO 30.

The FIFO 30 receives RDATA from the buffer manager 70 and outputs it as TD to the link core 20.

The FIFO state judgement circuit 31 within the FIFO 30 uses an internal counter to count the number of data items (FIFO count) in the FIFO 30. When the FIFO 30 becomes empty (when the number of data items is 0), EMPTY becomes active as shown at B6 in FIG. 28. When the FIFO 30 becomes full (when the number of data items is 2), FULL goes active (high) as shown at B7. The fact that the FIFO 30 is empty is conveyed by EMPTY and FIFOIN to the access request execution circuit 290 within the DMAC 40 and the link core 20. The fact that the FIFO 30 is full is conveyed by FULL to the access request generation circuit 292 within the DMAC 40.

The description now turns to the operation of the DMAC 40.

The access request generation circuit 292 makes RREQ go active on condition that FULL is inactive (low) as shown at B8 (indicating that the FIFO 34 is not full). IF RACK from the buffer manager 70 is accepted, RREQ goes inactive.

Note that in this embodiment of the invention, access requests from the DMAC 40 (or the DMAC 42) have the highest priority during bus arbitration for transmission. Therefore, if there is a conflict between RREQ from the DMAC 40 and another access request (Other REQ) from the CPU interface 60 and the DMAC 54 for ports, RREQ has priority. On the other hand, if there is already another access request from the CPU interface 60 and the DMAC 54 for ports, in front of RREQ, as shown at B9, the access request from the DMAC 40 is made to wait for a given time. Therefore, RDATA from the buffer manager 70 and TD from the link core 20 are not synchronized. For that reason, this embodiment of the invention is provided with the FIFO 30 for adjusting the phases of RDATA and TD. In this case, the FIFO 30 could be provided with the minimum number of stages necessary for phase adjustment (preferably no more than three stages; more preferably no more than two stages).

Figure 30B:
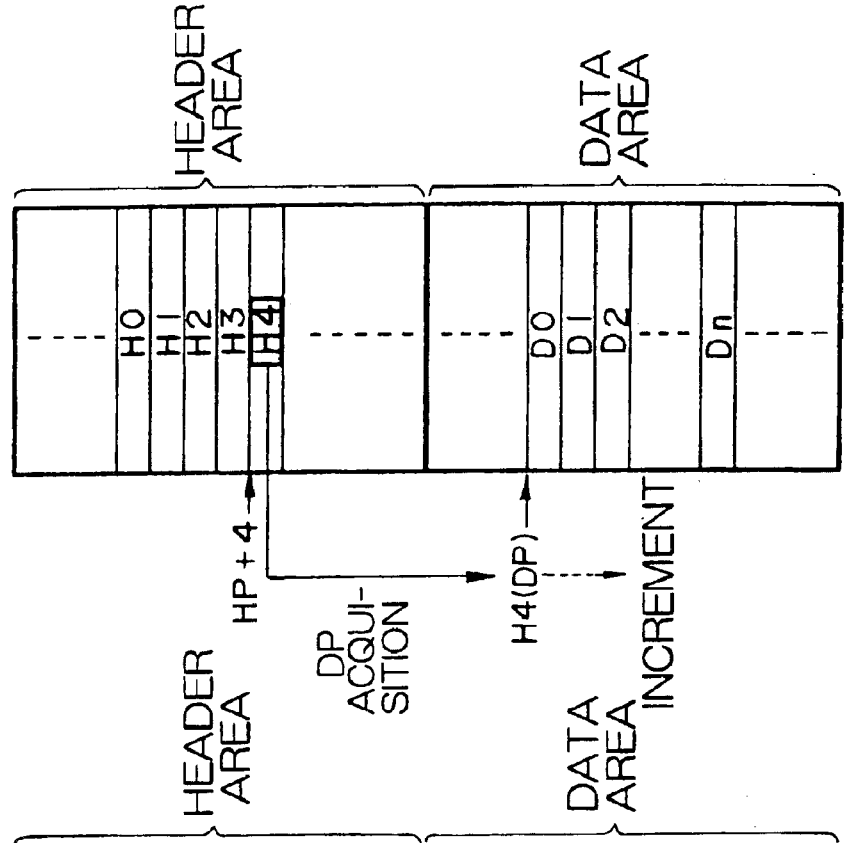
FIG. 30A, FIG. 30B are illustrative of the updating of the header pointer and data pointer.
Figure 30A:
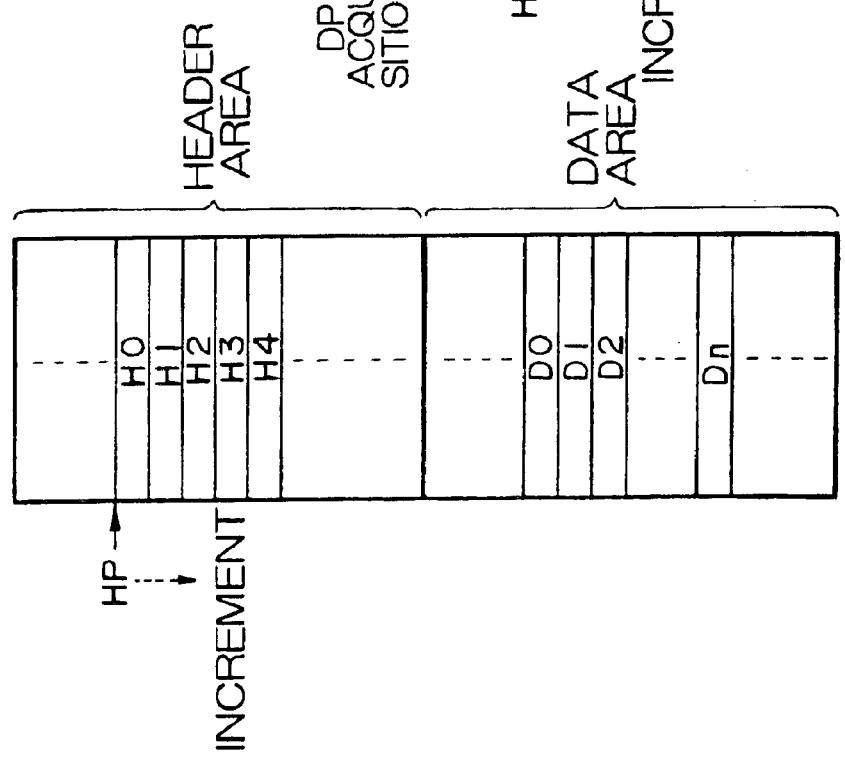

When transmission starts, the pointer update circuit 284 increments (broadly speaking, updates) the header pointer HP as shown in FIG. 30A. The address generation circuit 188 issues RADR in accordance with the thus incremented header pointer, as shown at B10 in FIG. 28. Thus the header portion of RDATA is sequentially read from the RAM 80.

When H4 is read as RDATA, the data pointer acquisition circuit 285 within the packet assembly circuit 280 acquires this H4 as the data pointer DP. More specifically, when H0 is read as RDATA, the tcode determination circuit 286 within the data pointer acquisition circuit 285 determines the tcode (see FIG. 29B) comprised within H0. If it is determined from the tcode (broadly speaking, the packet format identification information) that there is a data pointer in the fourth quadlet of the header, for example, the data pointer acquisition circuit 285 acquires H4 when H4 is read out as RDATA. In other words, H4 of RDATA is acquired as the data pointer and is output as RADR (see B11 in FIG. 28).

Note that the link core 20 in this embodiment of the invention utilizes the period during which the header CRC is being created to acquire the data pointer H4 from RDATA, as shown at B3 and B11. In other words, the creation of the header CRC is done by the link core 20 in this embodiment, so the DMAC 40 does not participate therein. On the other hand, the acquisition of the data pointer is done by the DMAC 40, so the link core 20 does not participate therein. For this reason, this embodiment of the invention positions the data pointer in the fourth quadlet in FIG. 29B, where the header CRC is positioned in FIG. 29A. The configuration is such that the period during which the header CRC is created is utilized for acquiring the data pointer H4 from RDATA. This makes it possible to prevent any wastage of the processing time.

When the data pointer is being acquired, the pointer update circuit 284 increments H4, which is the acquired data pointer, as shown in FIG. 30B. The address generation circuit 288 issues RADR in accordance with the incremented data pointer, as shown at B12 in FIG. 28. Thus the data portion of RDATA is sequentially read from the RAM 80.

When the transmission processing for one packet ends, the link core 20 makes TCMP go active as shown at B4 and the ACK write request generation circuit 294 makes WREQ go active as shown at B13. The ACK code that was sent using TACK from the link core 20 to the ACK write data and address generation circuit 296 is output as WDATA, as shown at B14. During this time, HP+7, which is the write address of the ACK code, is output as WADR. This configuration makes it possible to write back the ACK code from the destination code into the channel that was the transmission originator of the packet, as described with reference to FIGS. 23B and 23C.

Note that this setting of WADR to HP+7 is intended to write the ACK code back into the seventh quadlet of the header, as shown in FIG. 29B.

As described above, it is possible to combine a header in the header area with data in the data area, to assemble a send packet.

A particular feature of this embodiment is that the combining of headers and data is done by the DMAC 40, so it is not necessary for the link core 20 to participate therein. It is therefore possible to simplify the circuit configuration and the processing of the link core 20.

In this embodiment, the data pointer acquisition circuit 285 acquires the data pointer (H4) from RDATA then bases the issue of RADR on the thus-acquired data pointer, to read out the data. This makes it possible to combine each header accurately with the data associated with that header. It is therefore possible to simplify the circuit configuration and the processing necessary for the combining of headers and data.

Note that the setting of area boundaries that divide up the RAM 80 (P1 to P7 in FIG. 17), such as the boundary between the header area and the data area, is implemented by done through the CPU interface 60 by the CPU 66 (firmware) setting pointers indicating the address of each boundary into a pointer setting register that is comprised within the register 46 of FIG. 6.

4. Electronic Equipment

The description now turns to examples of electronic equipment comprising the data transfer control device of this embodiment.

Figure 31A:
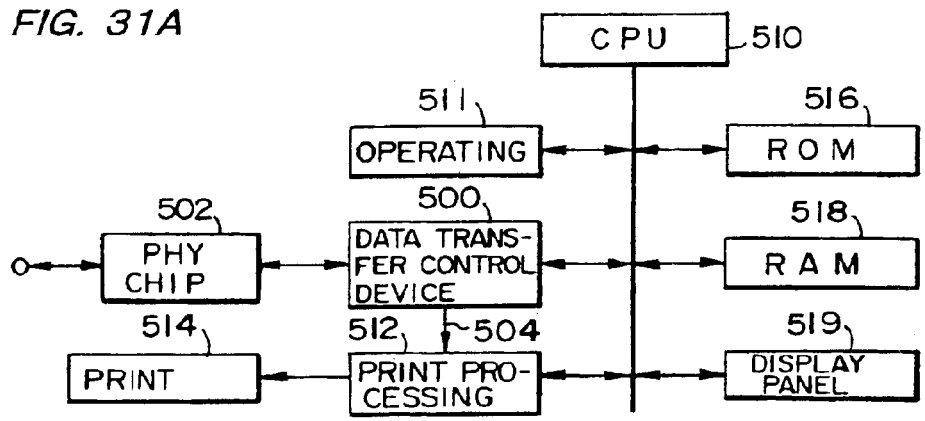
FIG. 31A, FIG. 31B, FIG. 31C show examples of the internal block diagrams of various items of electronic equipment.
Figure 32A:
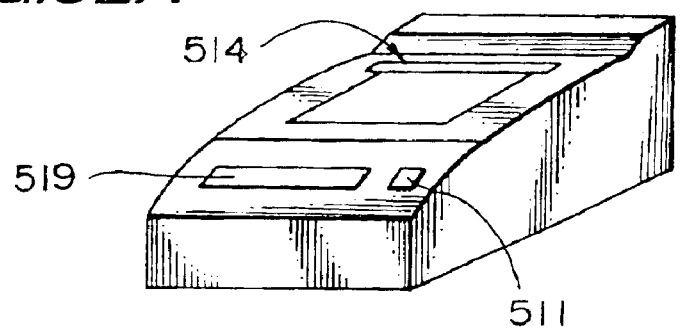
FIG. 32A, FIG. 32B, FIG. 32C show external views of various items of electronic equipment.

An internal block diagram of a printer that is one example of such electronic equipment is shown in FIG. 31A with an external view thereof being shown in FIG. 32A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY chip 502 and a data transfer control device 500 is sent directly to a print processing section 512 over a bus 504. The print data is subjected to given processing by the print processing section 512 and is output for printing to paper by a print section (a device for outputting data) 514.

Figure 31B:
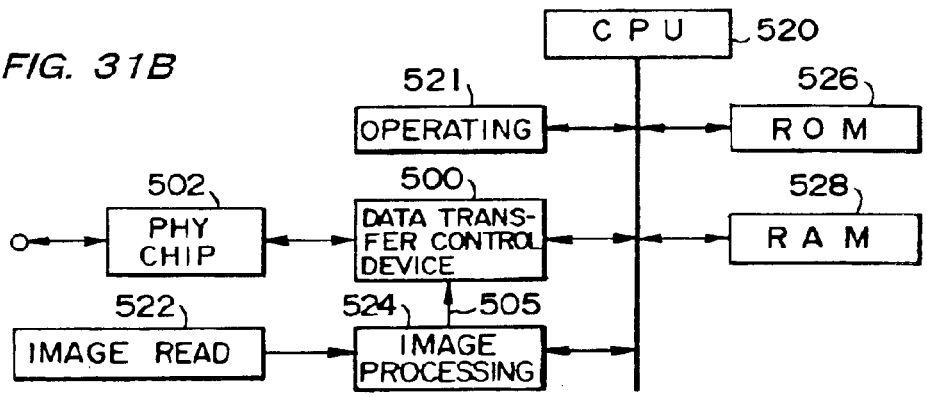
Figure 32B:
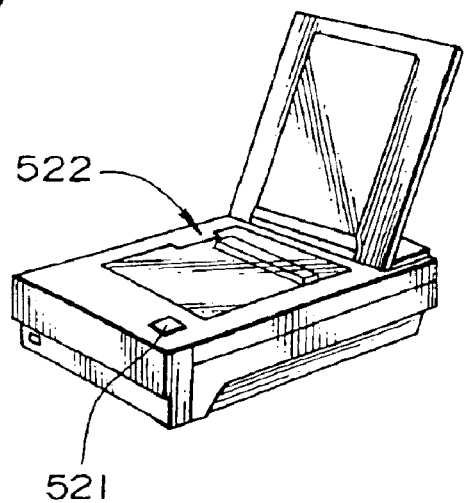

An internal block diagram of a scanner that is another example of electronic equipment is shown in FIG. 31B with an external view thereof being shown in FIG. 32B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY chip 502 to another node such as a personal computer.

Figure 31C:
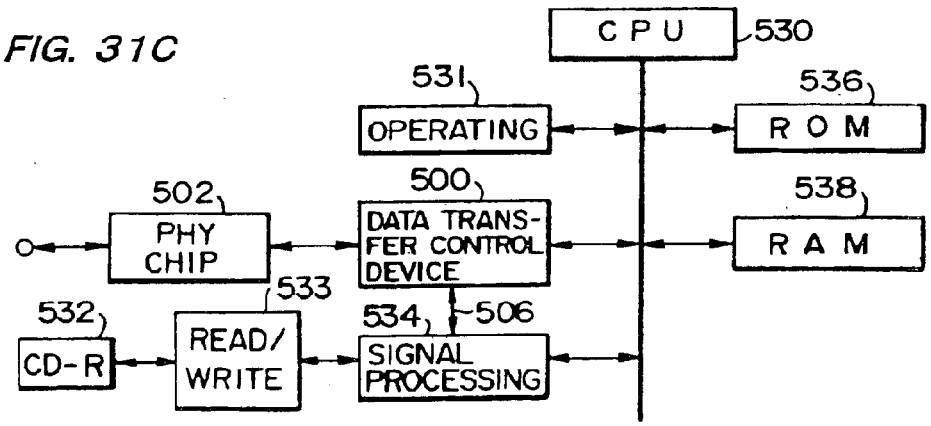
Figure 32C:
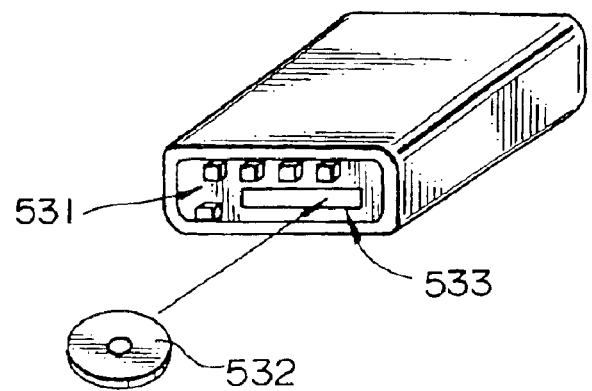

An internal block diagram of a CD-R drive that is a further example of electronic equipment is shown in FIG. 31C with an external view thereof being shown in FIG. 32C. A CPU 530 has various functions, including that of controlling the entire system. An operating section 531 is designed to allow the user to operate the CD-R. Data such as a control program is stored in a ROM 536 and a RAM 538 functions as a work area for the CPU 530.

Data read out from a CD-R 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by a read/write section 533 in the CD-R 532.

Note that another CPU for data transfer control by the data transfer control device 500 could be provided in addition to the CPU 510, 520, or 530 of FIG. 31A, 31B, or 31C.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-R or write data to a CD-R at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses, which enables reductions in the cost and size of the data transfer control device, thus reducing the cost and size of the electronic equipment.

Note that the electronic equipment that can employ a data transfer control device in accordance with the present invention is not limited to the above described embodiments, and thus that various other examples can be considered, such as various types of optical disk drive (CD-ROM or DVD), magneto-optic disk drives (MO), hard disk drives, TVs, VCRs, video cameras, audio equipment, telephones, projectors, personal computers, electronic data book, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 6, but it is not limited thereto. For example, the send packet area was described above as being divided into areas that correspond to a plurality of channels, but the storage means could also be divided into a control information area and a header area. In addition, various configurations other than that of FIG. 6 could be employed to implement the aspect of the present invention by which acknowledgment information equivalent to at least the number of packets that can be transferred in series, without confirming that acknowledgment information, such as that of FIG. 8.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, said data transfer control device comprising:

a management circuit which manages an interface with a random accessible storage memory so that control information of a packet is written by a first upper layer into a control information area of said random accessible storage memory and data of said packet corresponding to said control information is written by a second upper layer into a data area different from said control information area of said random accessible storage memory said randomly accessible storage memory being divided into said control information area and said data area;

a packet assembly circuit which reads control information of said packet from said control information area and reads data of said packet corresponding to said control information from said data area; and a link circuit which provides a service for transferring said read-out packet to each of nodes.

2. The data transfer control device as defined in claim 1, wherein said packet assembly circuit obtains a data pointer indicating an address of data that is to be read from said data area, from control information that has been read from said control information area, and uses the obtained data pointer to read data from said data area.

3. The data transfer control device as defined in claim 2, wherein said packet assembly circuit updates a control information pointer indicating an address of control information to be read from said control information area when it is determined based on packet format identification information included in said control information of said packet that said control information of said packet is read, and updates a data pointer indicating an address of data that is to be read from said data area when it is determined based on said packet format identification information that said data of said packet is read.

4. The data transfer control device as defined in claim 2, further comprising:

control information creation section which creates control information and writes said control information to said control information area, during processing for fetching data to said data area; and transmission start section which instructs means for instructing a start of transmission of a packet, on condition that both data fetch processing and control information write processing have been completed.

5. The data transfer control device as defined in claim 2, wherein said packet assembly circuit utilizes a period of time during which said link circuit creating error-checking information for said control information of said packet, to obtain a data pointer from control information.

6. The data transfer control device as defined in claim 5, wherein said packet assembly circuit updates a control information pointer indicating an address of control information to be read from said control information area when it is determined based on packet format identification information included in said control information of said packet that said control information of said packet is read, and updates a data pointer indicating an address of data that is to be read from said data area when it is determined based on said packet format identification information that said data of said packet is read.

7. The data transfer control device as defined in claim 5, further comprising:

control information creation section which creates control information and writes said control information to said control information area, during processing for fetching data to said data area; and transmission start section which instructs a start of transmission of a packet, on condition that both data fetch processing and control information write processing have been completed.

8. The data transfer control device as defined in claim 1, wherein said packet assembly circuit updates a control information pointer indicating an address of control information to be read from said control information area when it is determined based on packet format identification information included in said control information of said packet that said control information of said packet is read, and updates a data pointer indicating an address of data that is to be read from said data area when it is determined based on said packet format identification information that said data of said packet is read.

9. The data transfer control device as defined in claim 8, further comprising:

control information creation section which creates control information and writes said control information to said control information area, during processing for fetching data to said data area; and transmission start section which instructs a start of transmission of a packet, on condition that both data fetch processing and control information write processing have been completed.

10. The data transfer control device as defined in claim 1, further comprising:

control information creation section which creates control information and writes said control information to said control information area, during processing for fetching data to said data area; and transmission start section which instructs a start of transmission of a packet, on condition that both data fetch processing and control information write processing have been completed.

11. The data transfer control device as defined in claim 1, said data transfer control device further comprising:

a first bus connected to a next-stage application;

a second bus for controlling said data transfer control device;

a third bus connected electrically to a physical-layer device;

a fourth bus connected electrically to said storage memory; and an arbitration circuit which performs arbitration for establishing a data path between any one of said first, second, and third buses and said fourth bus.

12. The data transfer control device as defined in claim 1, wherein data transfer is performed in accordance with the IEEE 1394 standard.

13. Electronic equipment comprising: a data transfer control device as defined in claim 1;
- a device for performing given processing on data that has been received from another node via said data transfer control device and said bus; and
- a device for outputting or storing data that has been subjected to said processing.

14. Electronic equipment comprising: a data transfer control device as defined in claim 1;
- a device for performing given processing on data that is to be sent to another node via said data transfer control device and said bus; and
- a device for fetching data to be subjected to said processing.

15. The data transfer control device as defined in claim 1, further comprising a first-in first-out memory that is provided between said random accessible storage memory and said link circuit, and stores said packet read by said packet assembly circuit.

* * * * *